United States Patent
Shveidel et al.

(10) Patent No.: US 12,307,132 B1
(45) Date of Patent: May 20, 2025

(54) TECHNIQUES FOR PROVIDING I/O ATOMICITY AND PREVENTING DEADLOCK FOR CROSS SLICE BORDER I/Os IN A DISTRIBUTED STORAGE SYSTEM

(71) Applicant: Dell Products L.P., Hopkinton, MA (US)

(72) Inventors: Vladimir Shveidel, Pardes-Hana (IL); Lior Kamran, Rishon LeZion (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/585,675

(22) Filed: Feb. 23, 2024

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01)

(58) Field of Classification Search
None
See application file for complete search history.

(56) References Cited

U.S. PATENT DOCUMENTS

2017/0168945 A1* 6/2017 Chadha ............... G06F 13/4282
2021/0216213 A1* 7/2021 Shveidel ............. H04L 67/1001

OTHER PUBLICATIONS

U.S. Appl. No. 18/160,404, filed Jan. 27, 2023, entitled System and Method for Managing Data Portion Ownership in a Storage Cluster, Vladimir Shveidel, et al.

* cited by examiner

*Primary Examiner* — Arpan P. Savla
*Assistant Examiner* — Edmund H Kwong
(74) *Attorney, Agent, or Firm* — Muirhead and Saturnelli, LLC

(57) ABSTRACT

In at least one embodiment, processing can include: receiving, at a first node of a system, a cross slice border (CSB) I/O with a target location that crosses a CSB between two slices owned by different nodes; adding an entry for the CSB and CSB I/O to a cross border hash table (CBHT) of the first node; acquiring first locks for logical addresses of the first slice owned by the first node; sending a remote procedure call (RPC) to a second node requesting second locks for second logical addresses of the second slice owned by the second node; receiving an RPC reply in response to the RPC; and responsive to receiving an RPC reply indicating the negative acknowledgement, releasing the first locks and removing the entry from the CBHT of the first node.

20 Claims, 19 Drawing Sheets

1000

1002 — An initiator node of a storage system receives a first CSB I/O directed to a target location that crosses a slice border B11 between two slices Y1 and Y2. The target location includes logical addresses spanning the two slices Y1 and Y2 each owned by a different node in the dual node storage system. Each of the two slices Y1, Y2 can denote a consecutive contiguous logical address range, and collectively, the two slices can form a single contiguous logical address range CR of the same storage object such as a same logical device or volume V1. Y1 can be owned by a first node. Y2 can be owned by a remaining second node. The target location can include a first set S1 of logical addresses of slice Y1 owned by the first node and can include a second set S2 of logical addresses of slice Y2 owned by the second node. The initiator node that received the CSB I/O can generally be either the first node or the second node.

Slice Y1 can have a first consecutive logical address range R1 having a lower bound (LB) logical address of R1a and an upper bound (UB) logical address of R1b. Slice Y2 can have a second consecutive logical address range R2 with a LB address of R2a and an UB logical address of R2b. R1 can denote a lower address range than R2 such that each logical address of R1 is less than each logical address of R2. The single contiguous logical address range CR can have an associated LB=R1a and an associated UB=R2b.

The slice border or CSB B11 between the slices Y1 and Y2 can be denoted by R1b, the largest or last logical address of the slice Y1 having the lower address range relative to the two slices Y1 and Y2.

1004 — The initiator node adds a CBHT entry E11 for B11 for the first CSB I/O to the initiator node's CBHT, where E11 is associated with CBHT index I1. B11 can have an associated key=R1b that is mapped using a hash function HF to a particular index I1 of the CBHT, where HF(R1b)=HV1, where HV1 is mapped to, or denotes, I1.

1006 — The initiator node acquires first one or more local locks of the initiator node for all owned logical addresses related to the first CSB I/O (e.g., all logical addresses of the target location that are owned by the initiator node). If the initiator node is the first node that owns the slice Y1 and thus the logical addresses of S1, then the initiator node acquires the first one or more local locks for logical addresses S1 owned by the first node. If the initiator node is the second node that owns the slice Y2 and thus the logical addresses of S2, then the initiator node acquires the first one or more local locks for logical addresses S2.

1008 — The initiator node sends an RPC request to the peer node to acquire second one or more local locks of the peer node for all remaining logical addresses of the target location that are owned by the peer node. If the peer node is the first node that owns the slice Y1 and thus the logical addresses of S1, then the RPC is a request by the initiator node to acquire the second one or more locks for logical addresses S1 owned by the peer node. If the peer node is the second node that owns the slice Y2 and thus the logical addresses of S2, then the RPC is a request by the initiator node to acquire the second one or more locks for logical addresses S2 owned by the peer node. The RPC can identify: the particular CSB B11 such as by including B11's unique CBHT key=R1b, the logical addresses for which the initiator node is requesting to lock/acquire peer node's local locks, and the lock type requested.

The UD logical address space of volume or LUN A can be partitioned into slices, where exclusive ownership of each slice is then assigned to a single one of the nodes A or B on each of the systems 2102, 2104. In at least one embodiment, slices can be assigned in an alternating manner such as discussed in connection with Figure 6 such that node A owns all slices having an odd slice ID and node B owns all slices having an even slice ID. Thus node A 2102a and node A 2104a can both own the same first set of odd slices of LUN A; and node B 2102b and node B 2104b can both own the same set of even slices of LUN A.

System local volume instances V1 2124 and V2 2126 can be configured in a metro configuration such that the volume or instance pair (V1 2124, V2 2126) is configured for bi-directional or two-way synchronous replication, where V1 2124 and V2 2126 are each configured to have the same identity of LUN A when exposed to the host 2110a over paths 2108a, 2504. The host 2110a can send I/Os, and in particular CSB write I/Os, to any of the nodes 2102a-b, 2104a-b, respectively, of the systems 2102, 2104.

2604

An initiator node A 2102a of storage system 2102 receives a CSB write I/O directed to a target location of LUN A, where the target location of the CSB write I/O crosses a slice border B11 between two slices Y1 and Y2 of LUN A. The target location includes logical addresses spanning the two slices Y1 and Y2 each owned by a different node in the dual node storage systems 2102, 2104. Each of the two slices Y1, Y2 can denote a consecutive contiguous logical address range, and collectively, the two slices Y1, Y2 can form a single contiguous logical address range CR of the same storage object such as a same logical device or volume LUN A. Y1 can be owned by the node As 2102a, 2104a. Y2 can be owned by the node Bs 2102b, 2104b. The target location can include a first set S1 of logical addresses of slice Y1 owned by the node As 2102a, 2104a, and can include a second set S2 of logical addresses of slice Y2 owned by node Bs 2102b, 2104b.

Slice Y1 can have a first consecutive logical address range R1 having a lower bound (LB) logical address of R1a and an upper bound (UB) logical address of R1b. Slice Y2 can have a second consecutive logical address range R2 with a LB address of R2a and an UB logical address of R2b. R1 can denote a lower address range than R2 such that each logical address of R1 is less than each logical address of R2. The single contiguous logical address range CR can have an associated LB=R1a and an associated UB=R2b. The slice border or CSB B11 between the slices Y1 and Y2 can be denoted by R1b, the largest or last logical address of the slice Y1 having the lower address range relative to the two slices Y1 and Y2.

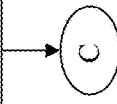

FIG. 12A

TECHNIQUES FOR PROVIDING I/O ATOMICITY AND PREVENTING DEADLOCK FOR CROSS SLICE BORDER I/Os IN A DISTRIBUTED STORAGE SYSTEM

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first node of a system, a cross slice border (CSB) I/O directed to a target location that includes logical addresses of two slices of a logical address range of a storage object, wherein a first of the two slices is owned by the first node and a second of the two slices is owned by a second node of the system, and wherein a first CSB denotes a slice border between the first slice and the second slice; adding a first entry to a first cross border hash table (CBHT) of the first node, wherein the first entry indicates that the CSB I/O includes a corresponding target location that crosses the first CSB; the first node acquiring first one or more locks for first logical addresses of the first slice owned by the first node, where the first logical addresses are included in the target location of the CSB I/O; the first node sending a remote procedure call (RPC) to the second node, wherein the RPC includes a request to acquire second one or more locks, on behalf of the first node, for second logical addresses of the second slice owned by the second node, wherein the second logical addresses are included in the target location of the CSB I/O; receiving, at the first node from the second node, an RPC reply in response to the RPC; determining whether the RPC reply indicates a positive acknowledgement or a negative acknowledgement regarding the request to acquire the second one or more locks for the second logical addresses owned by the second node; and responsive to receiving the RPC reply that indicates the negative acknowledgement, performing first processing including: the first node releasing the first one or more locks for the first one or more logical addresses owned by the first node; and the first node removing the first entry from the first CBHT of the first node.

In at least one embodiment, the first processing can include the first node restarting I/O processing for the CSB I/O. Restarting I/O processing for the CSB I/O can include: adding a second entry to the first CBHT of the first node, wherein the second entry indicates that the CSB I/O includes a corresponding target location that crosses the first CSB; the first node acquiring the first one or more locks for the first logical addresses of the first slice owned by the first node; the first node sending a second RPC to the second node, wherein the second RPC includes a second request to acquire the second one or more locks, on behalf of the first node, for the second logical addresses of the second slice owned by the second node; receiving, at the first node from the second node, a second RPC reply in response to the second RPC; determining whether the second RPC reply indicates a second positive acknowledgement or a second negative acknowledgement regarding the second request to acquire the second one or more locks for the second logical addresses owned by the second node; and responsive to receiving the second RPC reply that indicates the second negative acknowledgement, performing second processing including: the first node releasing the first one or more locks for the first one or more logical addresses owned by the first node; and the first node removing the second entry from the first CBHT of the first node.

In at least one embodiment, restarting I/O processing for the CSB I/O can include: responsive to receiving the second RPC reply that indicates the second positive acknowledgement, performing third processing including: performing I/O processing to service the CSB I/O; sending, from the first node, a third RPC to the second node, wherein the third RPC requests that the second node release the second one or more locks for the second one or more logical addresses owned by the second node; and the first node removing the second entry from the first CBHT of the first node. Processing can include: responsive to receiving the RPC reply that indicates the positive acknowledgement, performing second processing including: performing I/O processing to service the CSB I/O; sending, from the first node, a second RPC to the second node, wherein the second RPC requests that the second node release the second one or more locks for the second one or more logical addresses owned by the second node; and the first node removing the first entry from the first CBHT of the first node.

In at least one embodiment, processing can include: the second node receiving the RPC from the first node; and the second node atomically performing second processing that includes: querying a second CBHT of the second node, and attempting to add a second entry to the second CBHT of the second node, wherein the second entry indicates that the CSB I/O includes a corresponding target location that crosses the first CSB, wherein said second entry is added if said querying determines that there is no existing entry in the second CBHT for the first CSB. Processing can include: determining whether the second entry is successfully added to the second CBHT as a result of atomically performing said second processing; and responsive to determining that the second entry is successfully added to the second CBHT as a result of atomically performing said second processing, performing third processing including: acquiring, on behalf of the first node and in accordance with the request of the RPC, the second one or more locks for the second one or more logical addresses owned by the second node; and sending the RPC reply from the second node to the first node where the RPC reply indicates the positive acknowledgement. Successfully adding the second entry to the second CBHT as a result of atomically performing said second processing can indicate that there is no other outstanding concurrent CSB I/O directed to a second target location that crosses the first CSB by including corresponding logical addresses from both the first slice and the second slice.

In at least one embodiment, processing can include: responsive to determining that the second entry is not successfully added to the second CBHT as a result of atomically performing said second processing, performing fourth processing including: determining whether the first node is a winner; and responsive to determining the first node is the winner, performing fifth processing including: acquiring, on behalf of the first node and in accordance with the request of the RPC, the second one or more locks for the second one or more logical addresses owned by the second node; and sending the RPC reply from the second node to the first node where the RPC reply indicates the positive acknowledgement. The fourth processing can include: responsive to determining the first node is not the winner whereby the second node is alternatively the winner, performing sixth processing including: rejecting the request of the RPC to acquire the second one or more locks for the second one or more logical addresses owned by the second node; and sending the RPC reply from the second node to the first node where the RPC reply indicates the negative acknowledgement. Failing to add the second entry to the second CBHT as a result of atomically performing said second processing can indicate that there is already a second outstanding concurrent CSB I/O directed to a second target location that crosses the first CSB by including corresponding logical addresses from both the first slice and the second slice. Determining whether the first node is the winner can include determining which of the first node and the second node owns a particular one of the first slice and the second slice that is left of the first CSB, wherein the particular one slice left of the first CSB corresponds to a single one of the first slice and the second slice having a corresponding address range less than the first CSB.

In at least one embodiment, the CSB I/O can be a CSB read I/O requesting to read current contents from the target location, and wherein the first one or more locks and the second one or more locks are read or shared locks providing read or shared access, respectively, to the first one or more logical addresses owned by the first node and the second one or more logical addresses owned by the second node.

In at least one embodiment, the CSB I/O can be a CSB write I/O requesting to write new content to the target location, and wherein the first one or more locks and the second one or more locks are write or exclusive locks providing exclusive access, respectively, to the first one or more logical addresses owned by the first node and the second one or more logical addresses owned by the second node.

In at least one embodiment, processing can include, in response to receiving the RPC, the second node performing second processing including: detecting, using a second CBHT of the second node, a deadlock or a potential deadlock with respect to the first CSB in that there is a second concurrent outstanding CSB I/O that was received by the second node and that is directed to a second target location crossing a same CSB, the first CSB, as the CSB I/O where the second target location includes corresponding logical addresses from both the first slice and the second slice; the second node determining that the second node is a winner and the first node is a loser in connection with the deadlock or potential deadlock between the second concurrent outstanding CSB I/O received by the second node and the CSB I/O received by the first node; and responsive to determining the second node is the winner and the first node is the loser in connection with the deadlock or potential deadlock, performing third processing including: rejecting the request by the first node to acquire the second one or more locks; and the second node returning the RPC reply indicating the negative acknowledgement.

In at least one embodiment, in response to receiving the RPC, the second node can performs second processing including: detecting, using a second CBHT of the second node, a deadlock or a potential deadlock with respect to the first CSB in that there is a second concurrent outstanding CSB I/O that was received by the second node and that is directed to a second target location crossing a same CSB, the first CSB, as the CSB I/O where the second target location includes corresponding logical addresses from both the first slice and the second slice; the second node determining that the first node is a winner and the second node is a loser in connection with the deadlock or potential deadlock between the second concurrent outstanding CSB I/O received by the second node and the CSB I/O received by the first node; and responsive to determining the first node is the winner and the second node is the loser in connection with the deadlock or potential deadlock, performing third processing including: the second node acquiring the second one or more locks on behalf of the first node; and the second node returning the RPC reply indicating the positive acknowledgement.

In at least one embodiment, in response to receiving the RPC, the second node can perform second processing including: determining, using a second CBHT of the second node, that there is no deadlock or potential deadlock with respect to the first CSB in that there is no second concurrent outstanding CSB I/O directed to a second target location crossing a same CSB, the first CSB, as the CSB I/O where the second target location includes corresponding logical addresses from both the first slice and the second slice; the second node granting the request of the RPC sent by the first node, wherein said granting includes acquiring the second one or more locks on behalf of the first node; and the second node returning the RPC reply indicating the positive acknowledgement.

In at least one embodiment, the system can be a first storage system included in a metro configuration with a second storage system, wherein the CSB I/O can be a write I/O directed to a first storage object, wherein the first storage system can include a first instance of the first storage object and the second storage system can include a second instance of the first storage object, wherein the first instance and the second instance can be configured for bi-directional or two-way synchronous replication such that writes directed to the first storage object received at the first storage system are automatically synchronously replicated to the second storage system and writes directed to the first storage object received at the second storage system are automatically synchronously replicated to the first storage system.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 9A, 9B, 10A, 10B, 12A, 12B and 12C are flowcharts of processing steps that can be performed in at least one embodiment in accordance with the techniques of the present disclosure.

DETAILED DESCRIPTION OF EMBODIMENT(S)

Figure 1:
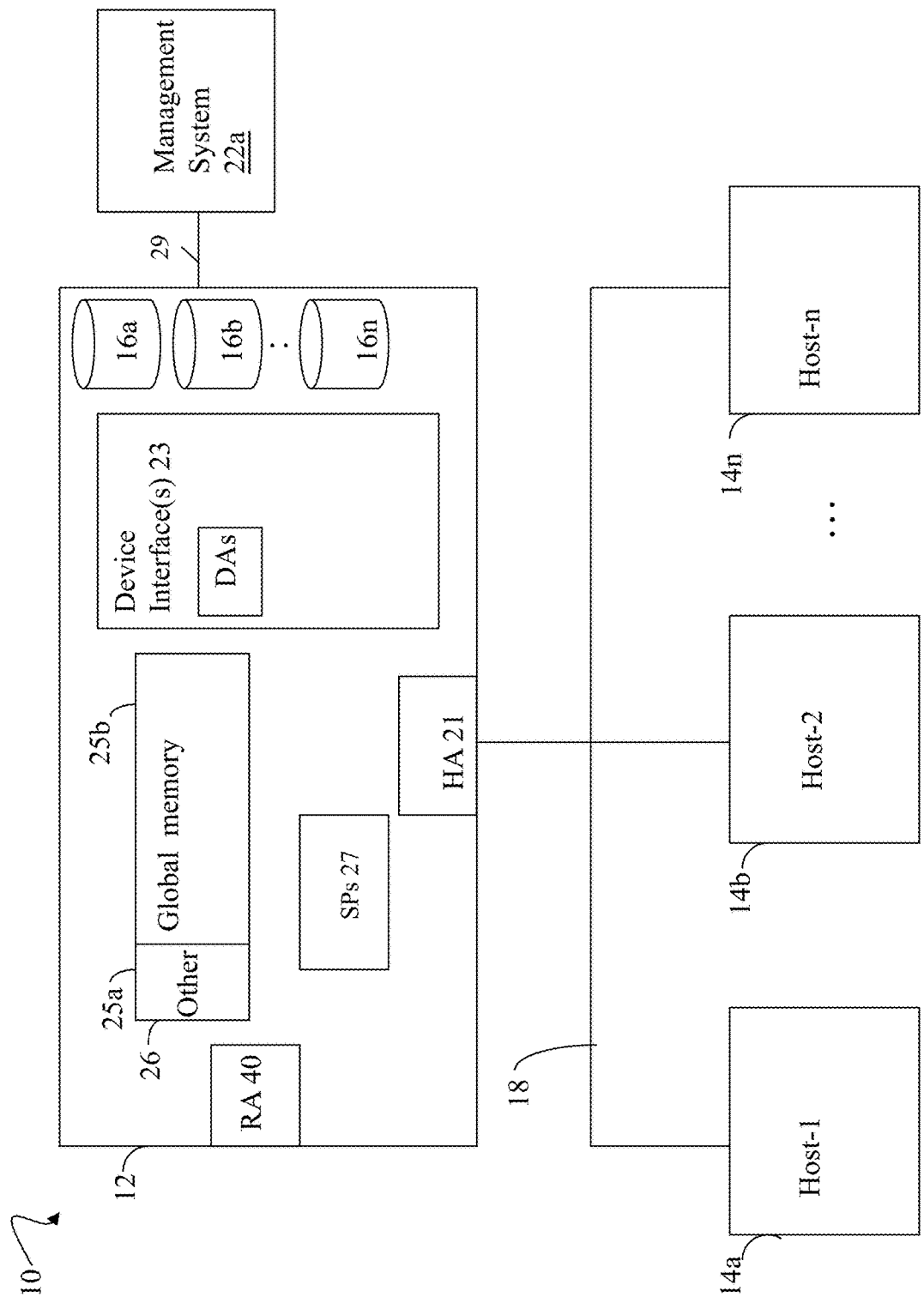
FIGS. 1 and 11 are examples of components that may be included in systems in at least one embodiment in accordance with the techniques of the present disclosure.

A data storage system can use a log for recording user or client updates, and can also use a metadata log for recording updates to metadata pages. The metadata (MD) pages can be used in connection with chains of mapping information that map logical addresses to storage locations including content stored at the logical addresses.

An entry from the log of user or client updates (sometimes referred to as the UD (user data) log) can be an update, such as a client write I/O, to a logical address (e.g., LUN or logical device and LBA or logical block address) which writes content to a UD page. Flushing the entry from the UD log can include writing the updated UD page to a backend storage location on non-volatile storage (e.g., BE (back end) PD (physical storage device) location). Additionally, flushing the entry from the UD log can include creating and/or updating one or more the corresponding MD pages which map the logical address to its corresponding BE PD location including the content stored at the logical address. In at least one embodiment, the mapping information including MD pages can thus be updated. For example, such updating of the mapping information can include updating at least one MD page in a chain of MD pages used in connection with mapping the logical address to the BE PD location including the content stored at the logical address. Read I/Os or requests to read the content of a UD logical address can use an existing chain of MD pages to map the UD logical address to the persistent storage location including content stored at the UD logical address.

In an active-active storage system including multiple nodes that can receive and service I/Os, nodes of the cluster should be synchronized to guarantee consistency of UD pages and MD pages that can be accessed by the multiple nodes. A classical problem that may occur in connection with the active-active architecture of the dual node appliance is deadlock or a potential deadlock in the case where, for example, both nodes of the appliance initiate an update for the same objects or pages, such as the same UD pages, concurrently. A deadlock is a situation in which two processes, threads, programs or other code entities sharing the same resource are effectively preventing each other from accessing the resource, resulting in blocking execution of both processes, threads, programs or other code entities. For example, node A needs both resource A of node A and resource B of node B to service a first I/O. Additionally, node B also needs both resources A and B to service a second I/O. Node A requests and receives resource A of node A. Node B requests and receives resource B of node B. Node A, while holding resource A, now requests resource B of node B but is blocked since resource B is currently held node B. In a similar manner, node B, while holding resource B, now requests resource A of node A but is blocked since resource A is currently held by node A. In the foregoing, a deadlock may be detected between both the nodes A and B. More generally, the potential for deadlock may occur in connection with any scenario where two consumers are both attempting to acquire the same shared resources and each of the two consumers have a mutual dependency on each other and hold a shared resource the other needs to proceed.

One existing technique for resolving a detected deadlock or avoiding a potential deadlock such as with two nodes of the dual node appliance in a deadlock scenario as noted above includes permanently assigning a single fixed dedicated winner node and permanently assigning a single fixed dedicated loser node. In this solution, a first node of the two nodes may be permanently selected and assigned as the fixed predetermined winner and a second of the two nodes may be permanently selected and assigned as the fixed predetermined loser with respect to any/all detected deadlocks or potential deadlocks between the two nodes. In response to a detected deadlock or potential deadlock, the loser node always aborts or releases any resources held that are causing the deadlock. In response to a detected deadlock or potential deadlock, the winner node is always allowed to continue processing and subsequently acquires the needed resources released by the loser node.

However, the foregoing solution of fixed permanent dedicated assignments of the node roles of winner and loser to particular nodes has drawbacks. For example, always having one of the nodes be a winner and always having the other node be the loser provides for node asymmetry that may result in a load imbalance between the nodes. Additionally, there is a fairness issue in that the same winner node is always allowed to proceed for a detected deadlock and given priority over the other loser node. In some instances, this could result in the loser node potentially being indefinitely blocked by the winner node. For example, in some instances, the loser node may be not be able to make any progress with a particular task, operation or transaction. Each time the loser node attempts to acquire a shared resource for the particular task, operation or transaction and a deadlock or potential deadlock is detected, the loser node may be forced to abort the particular task or operation, and release any shared resource currently held or acquired. Subsequently, the loser node may continually retry and repeat processing for the transaction, task or operation aborted. In contrast, the winner node (that conflicted with the loser node causing the detected potential deadlock) is allowed to always proceed and acquire any needed resources released by the aborted loser node. The adverse impact of both of the foregoing factors may increase as the system load increases thereby resulting in system performance degradation.

Accordingly, described in the following paragraphs are techniques that can be used to overcome at least the foregoing drawbacks. In at least one embodiment, the techniques of the present disclosure can be used in an active-active dual node storage system in connection with processing I/Os to provide for I/O atomicity, synchronization and data coherency. In at least one embodiment, an I/O can be directed to a mixed ownership target location that includes a first portion of logical addresses and a second portion of logical addresses, where the first portion is owned exclusively by a first node and the second portion is owned exclusively by a second node. In at least one embodiment, the I/O can be characterized as a cross slice border I/O that crosses a slice border between first and second slices, where the first portion of the target location denotes a first set of one or more contiguous consecutive UD logical addresses of the first slice of a storage object, where the second portion denotes a second set of one or more contiguous consecutive UD logical addresses of the second slice of the same storage object, where the first slice is owned exclusively by the first node and the second slice is owned exclusively by the second node, and where the first and second slices, and in particular the first and second portions, can collectively or in the aggregate denote a single contiguous logical address range of the same storage object.

In at least one embodiment, a node can receive a cross slice border I/O (sometimes referred to as a CSB I/O), where the CSB I/O is directed to a target location that crosses a slice border between two slices each owned by a different node and where the target location includes logical addresses of the two slices. Put another way, the CSB I/O includes a target location crossing or spanning across two slices each owned by a different node in a multi-node system. In such an embodiment, the receiving node or the initiator node that receives the CSB I/O can lock the entire range of logical addresses of the target location prior to servicing the I/O. In at least one embodiment where the target location includes logical addresses of the first portion of the first slice owned by the first node and the second portion of the second slice owned by the second node, the node receiving the CSB I/O can acquire first one or more locks of the first portion of the first slice owned by the first node and can acquire second one or more locks of the second portion of the second slice owned by the second node. In at least one embodiment, the first one or more locks can be local locks of the first node since the corresponding logical addresses of the first portion (and first slice) are owned exclusive by the first node, and the second one or more locks can be local locks of the second node since the corresponding logical addresses of the second portion (and second slice) are owned exclusively by the second node. In at least one embodiment after all locks of the target location of the CSB I/O are acquired by the receiving node, the CSB I/O can be serviced. In at least one embodiment, servicing the CSB I/O can include the first node servicing the first portion of logical addresses of the first slice owned by the first node; and the second node servicing the second portion of the logical addresses of the second slice owned by the second node. In at least one embodiment once servicing of the CSB I/O is completed by both the nodes, the particular node that is also the receiving node can return an acknowledgement regarding I/O completion to a host or other storage client that sent the I/O to the receiving node.

In at least one embodiment, the techniques of the present disclosure provide for tracking CSB I/Os that cross slice borders where each of the CSB I/Os is directed to a target location including a first logical address of a first slice owned by the first node and including a second logical address of a second slice owned by the second node. For CSB I/Os, the techniques of the present disclosure can implement cross slice border serialization or synchronization semantics allowing a single concurrent I/O that crosses a particular slice border. In at least one embodiment, processing can track the particular slice border or boundary that is crossed such that only a single concurrent I/O having a target location of logical addresses crossing the particular slice border is allowed to be serviced at a time. In the case of a potential deadlock scenario of multiple concurrent I/Os from both nodes where the multiple concurrent I/Os have corresponding target locations that cross the same slice border, the potential deadlock scenario can be avoided or resolved by determining a node winner (that is allowed to proceed with its particular one of the multiple concurrent I/Os) and by determining a remaining peer node loser does not proceed with its particular one of the multiple concurrent I/Os. In at least one embodiment, the peer node loser releases any held or acquired locks of the loser node as related to its particular one of the multiple concurrent I/Os crossing the same slice border.

In at least one embodiment, consider a border B1 between a first slice of first logical addresses and a second slice of second logical addresses, where the first logical addresses form a lower range of contiguous and consecutive logical addresses, where the second logical addresses form an upper range of contiguous and consecutive logical addresses, and where the first and second logical addresses collectively form a consecutive contiguous range of logical addresses. In at least one embodiment, the winner node can be defined by the ownership of the first slice that is "left from the border B1" (e.g., owner node of the lower range of logical addresses), and the loser node can be the remaining peer node owner of the second slice. In at least one embodiment, the border B1 between the first and second slices of consecutive contiguous logical addresses of the same storage object can be denoted using a selected unique logical address that provides for uniquely identifying the cross slice logical address border B1 between the first and second slices. In at least one embodiment, the border B1 between the first and second consecutive contiguous logical address slices can be denoted by the last or largest logical address of the first slice. In at least one embodiment where the storage object is a logical device or volume V1, the border B1 between the first and second consecutive contiguous logical address slices of V1 can be the largest logical block address or largest LBA of the first slice. In at least one embodiment, each node can track pending or in-progress cross slice border I/Os that cross a particular border in a corresponding node-local cross border or cross slice border hash table (CBHT). In at least one embodiment, the CBHT of a node can use a CSB logical address that uniquely identifies the particular border between two corresponding slices where one of the slices is owned by a first node and the remaining slice is owned by the remaining second peer node. In at least one embodiment, the CSB logical address for a border or CSB B1 between first and second slices of logically consecutive contiguous logical addresses can be the largest or last logical address of the first slice, where a first node owns the first slice and a second peer node owns the second slice, where the first slice has a first contiguous range of logical addresses, the second slice has a second range of contiguous logical addresses, and where the first contiguous range of logical addresses are logically and immediately prior to (and consecutive with) the second contiguous range of logical addresses. In at least one embodiment, the CBHT can use unique CSB logical addresses as keys, where the unique CSB logical addresses each uniquely identify a corresponding cross slice border between two logically consecutive slices each owned by a different one of the nodes.

In at least one embodiment, ownership of logical address slices can be assigned to the nodes through interleaving in an alternate manner. In at least one embodiment, the logically consecutive and contiguous slices can be partitioned among the nodes as equally as possible in an alternating manner. In this manner in at least one embodiment, borders can have corresponding predefined or predetermined node winners in an alternating interleaved manner providing a fair and symmetric scheme for resolving a detected potential deadlock between the nodes in connection with multiple concurrent cross slice border I/Os directed to target locations including the same slice border.

In at least one embodiment, the techniques of the present disclosure can be used to provide I/O atomicity, synchronization and consistency for CSB I/Os among nodes of a multiple node storage system or appliance. In at least one embodiment, the techniques of the present disclosure can also be used to provide I/O atomicity, synchronization and consistency for CSB I/Os in one or more suitable applications among multiple storage systems or appliances. For example, in at least one embodiment, the techniques of the present disclosure can be used in connection with a metro synchronous replication configuration (sometimes referred to simply as a metro configuration) between two storage systems where each of the two storage systems includes two nodes and can perform processing consistent with the techniques of the present disclosure. In at least one embodiment of a metro configuration, each of the two storage systems can include a separate instance of a storage object such as a logical device or volume V1, where the two instances of V1 on the two storage systems are configured as the same logical device or volume such that the two instances of V1 are configured to have the identity when presented or exposed to an external host over paths to the two storage systems. The foregoing two instances of V1 of the metro configuration can be configured for bi-directional or dual synchronous replication, where host writes to instance I1 of V1 on the first storage system are automatically and synchronously replicated to instance I2 of V1 on the second storage system; and where host writes to instance I2 of V1 on the second storage system are automatically and synchronously replicated to instance I1 of V1 on the first storage system. In at least one such embodiment, a first node of the first storage system can receive a write I/O directed to V1 from a host or other storage client, where the first node of the first storage system handles communications with the second storage system. In at least one embodiment of the metro configuration, the techniques of the present disclosure can be used to provide atomicity with respect to the entire target logical address range T1 of the write I/O including: acquiring locks on the entire target logical address range on both storage systems; and responsive to acquiring the locks on both storage systems, then servicing the write I/O on both storage systems. In at least one embodiment of a metro configuration where the write I/O is a CSB I/O that writes to the target logical address range T1 crossing CSB B1, the techniques of the present disclosure can be used in connection with acquiring first locks for T1 on the first storage system, and acquiring second locks for T1 on the second storage system. Responsive to acquiring the foregoing first and second locks across the first and second storage systems, the write I/O can be serviced by the first and second storage systems of the metro configuration. In this manner in at least one embodiment of a metro configuration, the techniques of the present disclosure can be used in connection with providing locking and serialization for the write I/O that is a CSB I/O within each single storage system where the write I/O's target logical address ownership is mixed or split among the two nodes of each single storage system.

In at least one embodiment, each of the two storage systems of the metro configuration can assign exclusive ownership of slices of the target logical address range to the same corresponding nodes. For example, the first storage system can include two nodes A and B where the write I/O's target logical address range T1 includes a first logical address LA1 of slice 1, and a second logical address LA2 of slice 2, where LA1 and LA2 can be consecutive contiguous logical addresses of V1, where slice 1 is owned by node A, and where slice 2 is owned by node B. In a similar manner, the second storage system can also include two nodes A and B where slice 1 is owned by node A, and slice 2 is owned by node B. More generally, a first set of slices of V1 can be owned exclusive by node A of the first storage system and a second set of slices of V1 can be owned exclusively by node B of the first storage system. In at least one embodiment, the second storage system can also have 1) a corresponding node A that is also assigned the same first set of slices of V1; and 2) corresponding node B that is also assigned the same second set of slices of V1.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device or other non-volatile storage device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
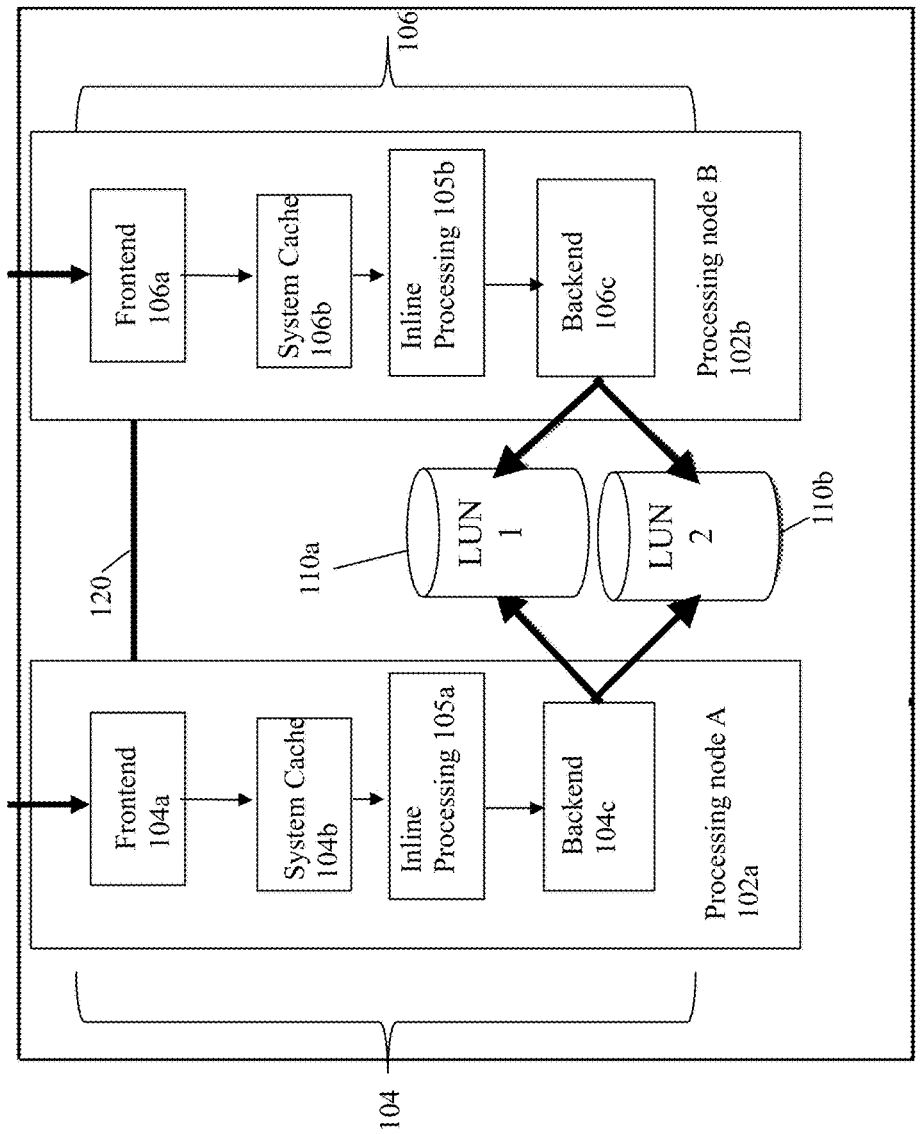
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
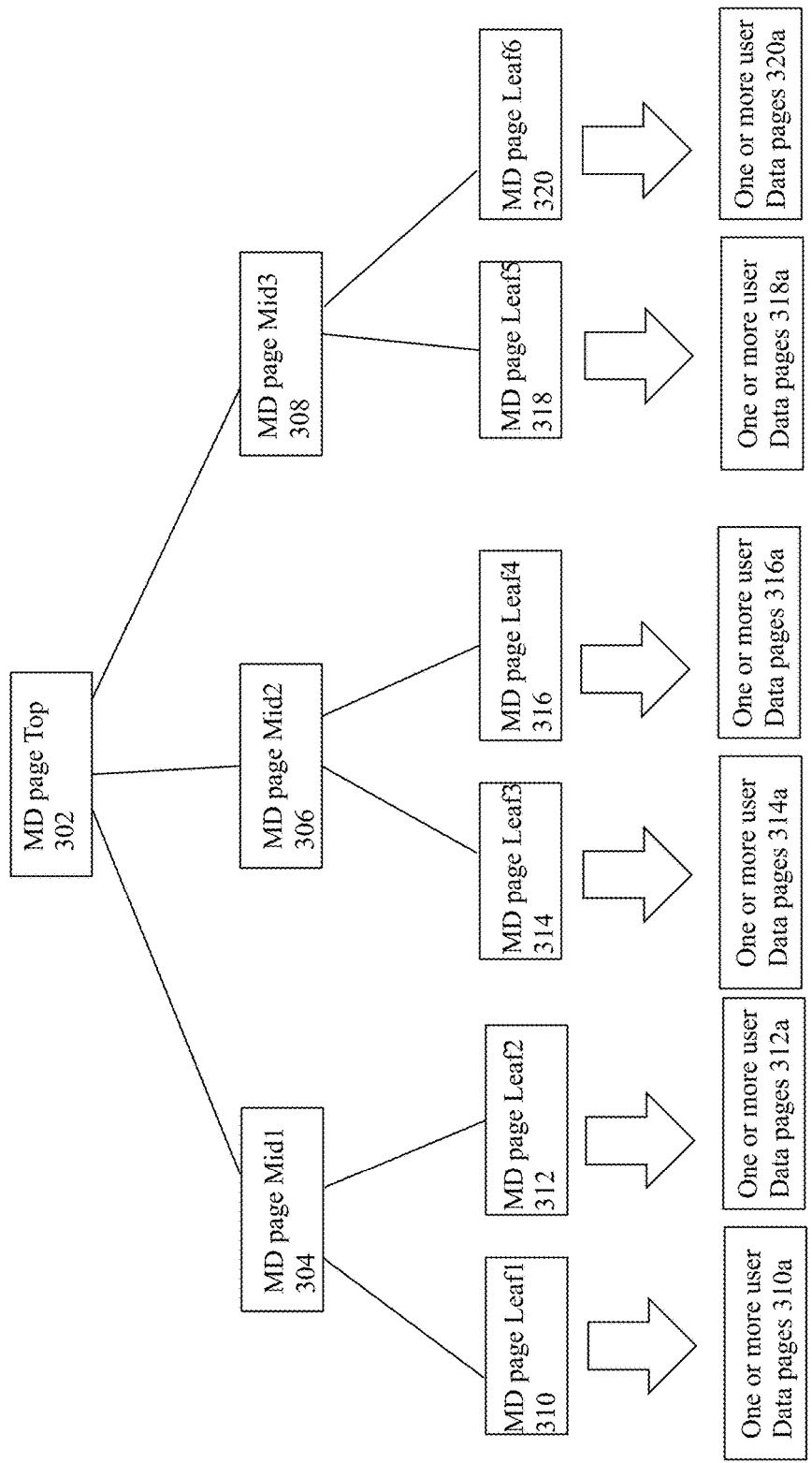
FIGS. 3, 4, and 5 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log such as a user data (UD log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
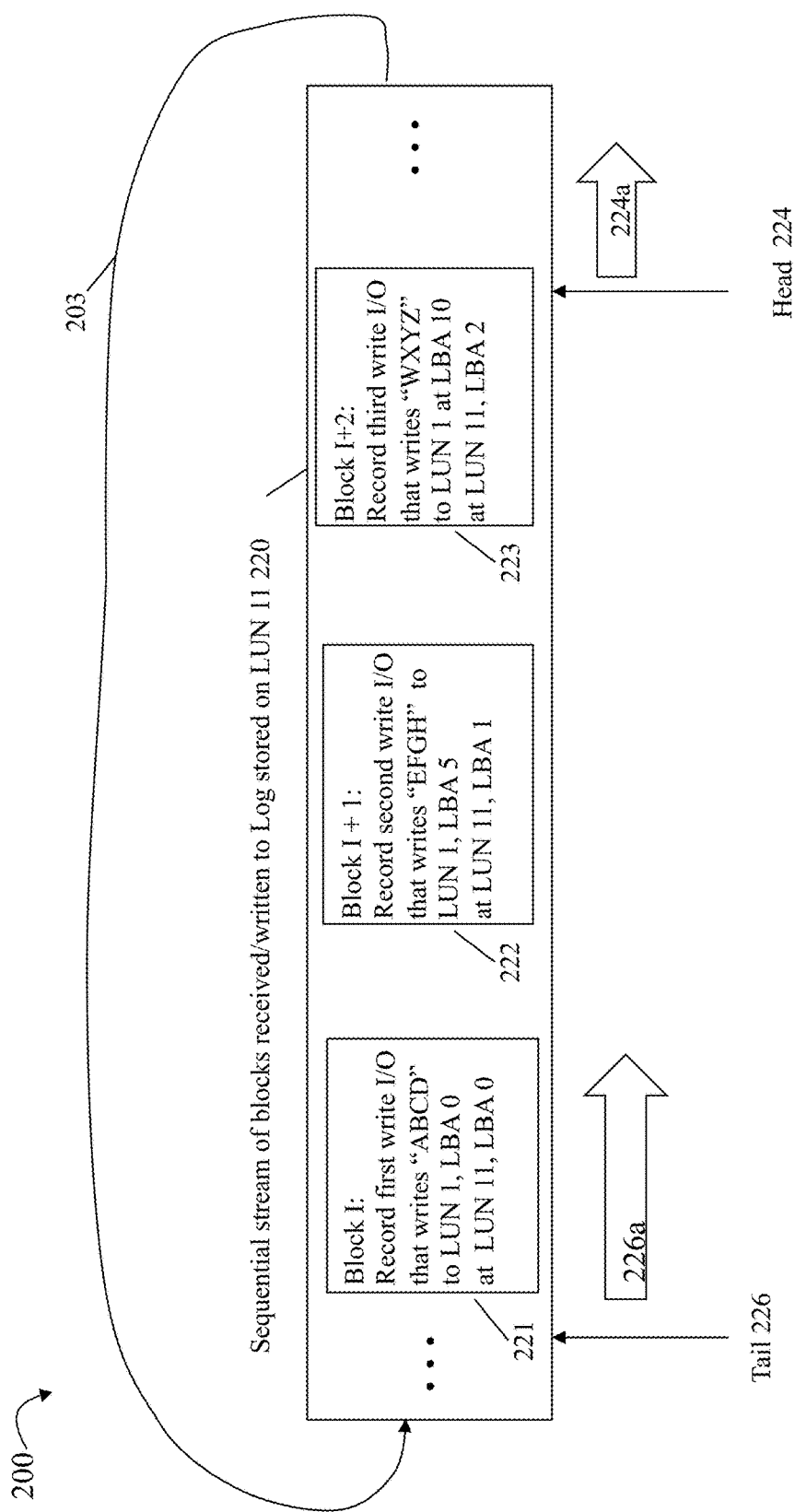
FIGS. 2B, 2C and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
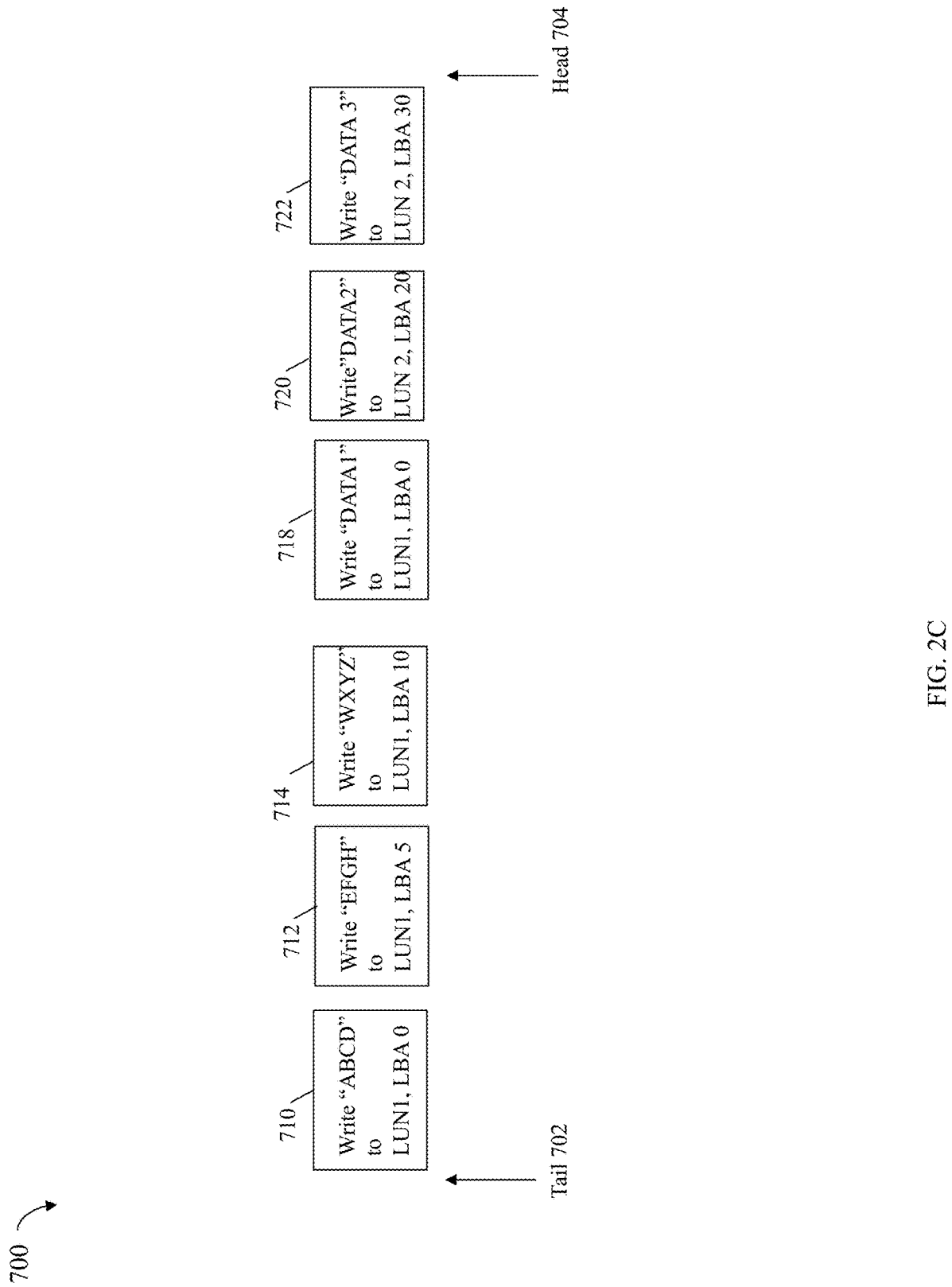

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
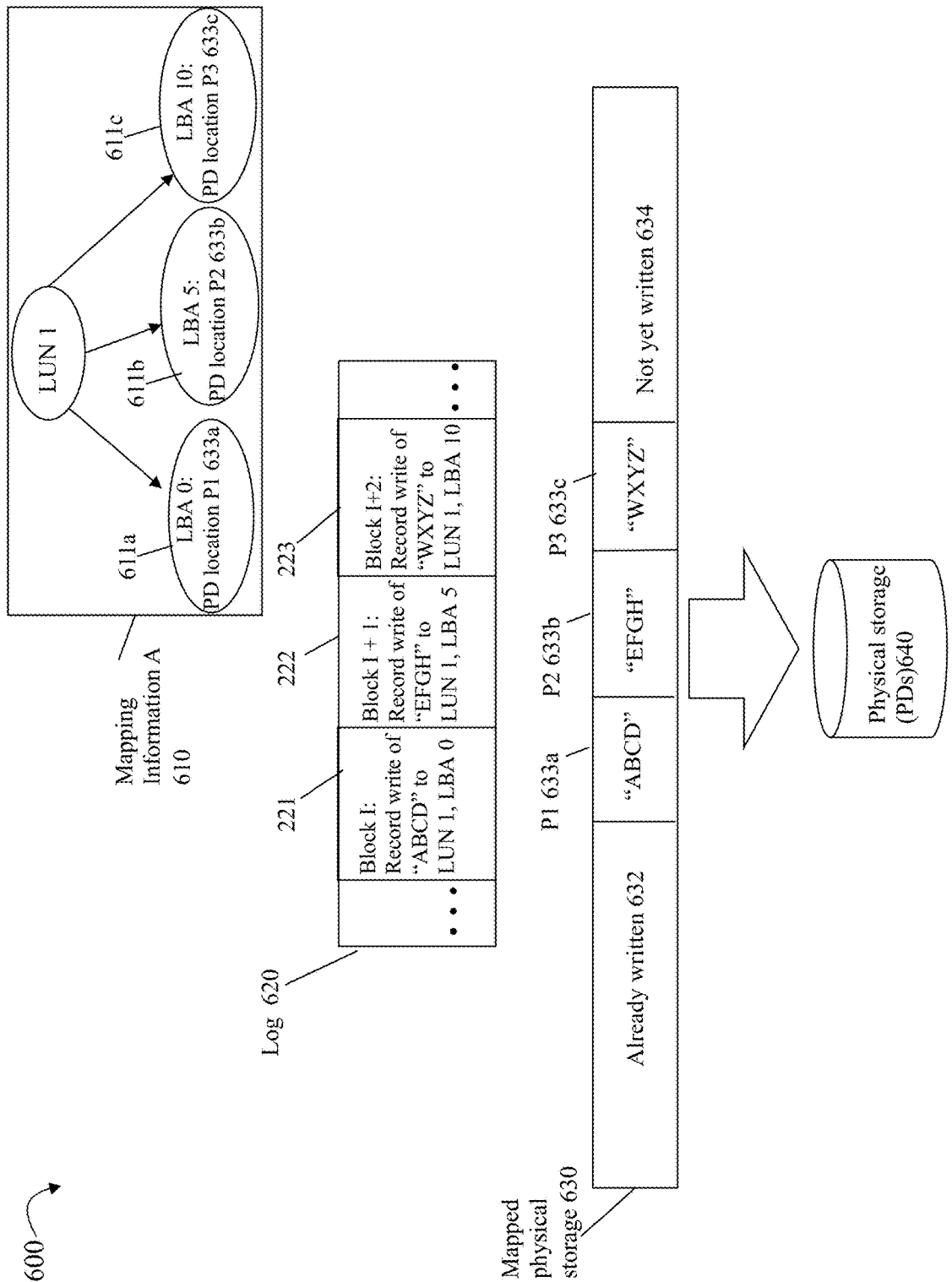

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log having data that is laid out sequentially in the order it is written to the log.

The data layout of the user data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310a, 312a, 314a, 316a, 318a and 320a include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
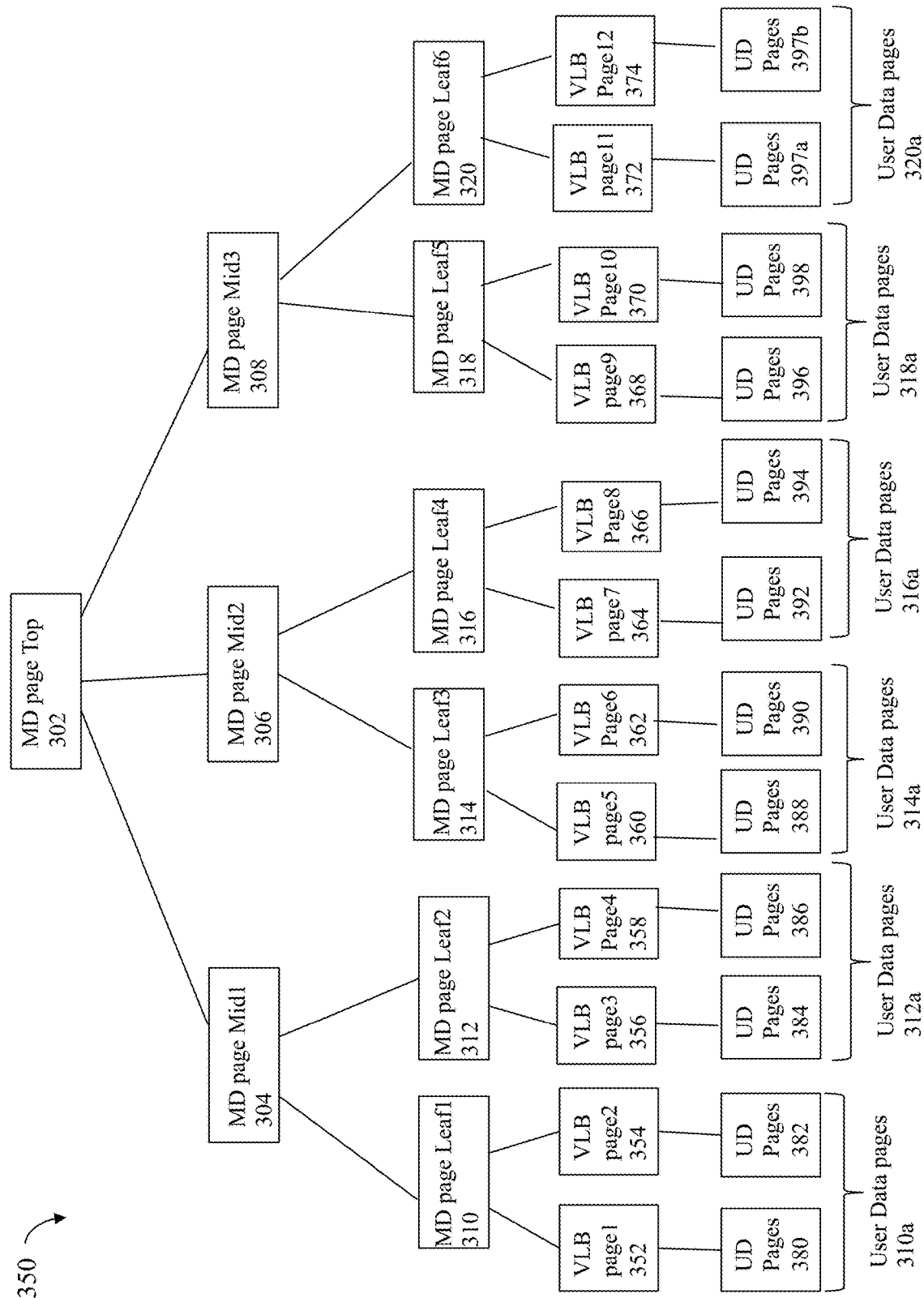

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
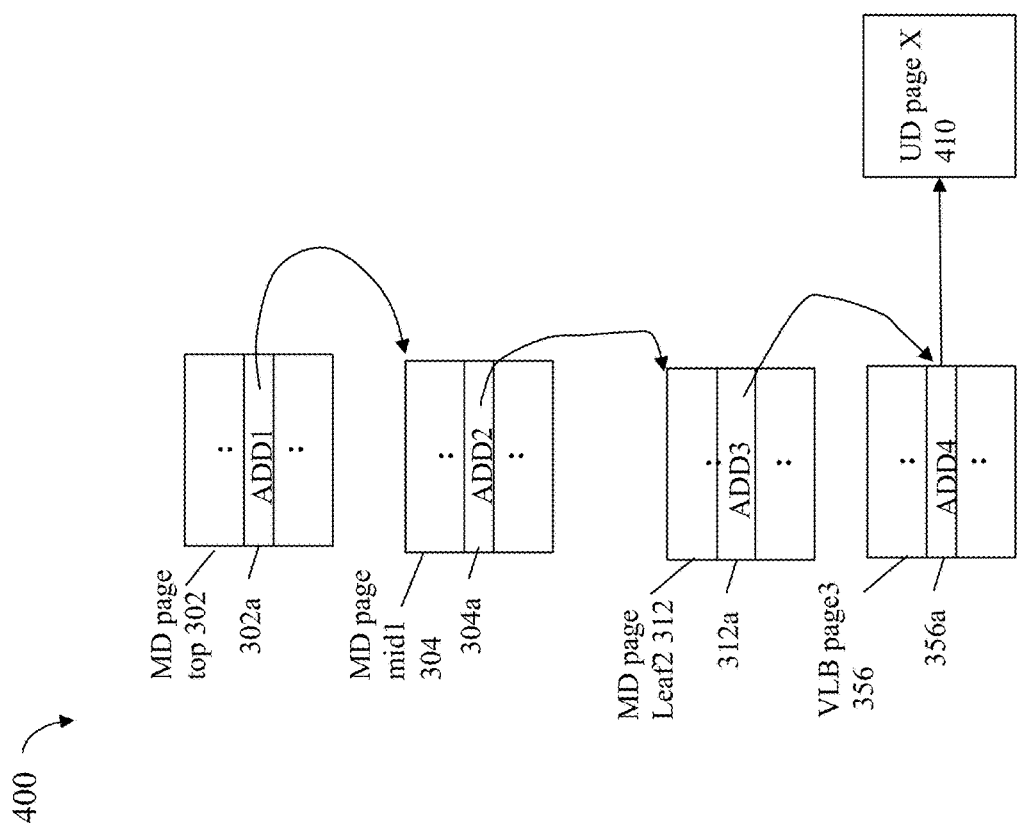

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally in at least one embodiment, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6.

In at least one embodiment, updates or modifications to the MD pages of the MD or mapping structure described in connection with the FIGS. 3-5 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-5 can be persistently stored in a MD page store on the BE PDs of the system. In some contexts herein, the copy of a MD page as stored in the MD page store on the BE PDs can also be referred to herein as the on-disk copy of the MD page.

In some contexts herein, a node which receives an I/O operation can be referred to as the initiator node with respect to that particular I/O operation. In some contexts herein, a node can also be referred to as an initiator with respect to initiating sending a message or request to a peer node, where the peer node can be referred to as a target with respect to the message or request. In response to receiving the message or request, the target node can perform processing to service the request or received message, and then send a reply, response or return message to the initiator. In at least one embodiment, internode communications such as the foregoing can be sent over the internode communication link or connection 120 of FIG. 2. In at least one embodiment, a first node can send a remote procedure call (RPC) requesting that the peer node perform a specified operation denoted by the RPC. The peer node can perform the requested processing denoted by the RPC call and then return an RPC reply or response to the first node. In at least one embodiment, the foregoing RPC call and reply or response can be sent as corresponding messages between the nodes over the internode communication link or connection 120.

Consistent with other discussion herein, there are various scenarios and applications where the storage system provides I/O atomicity in connection with servicing I/Os received from one or more hosts or other external storage clients. The I/Os can include read and/or write I/Os. I/O atomicity means that the I/O is performed transactionally such that the I/O is performed as an atomic unit, or otherwise not performed at all. Put another way, if the I/O is directed to a target logical address range or location including multiple logical addresses, the I/O operation is performed with respect to all the multiple logical addresses atomically or transactionally, or not at all. In this manner such as with respect to a write I/O to multiple target logical addresses, the external host or client can view or read content such that either the entire write I/O is applied to all the multiple target logical addresses, or the write I/O is not applied to any of the multiple target logical addresses.

Some applications, such as some database applications and/or some file systems, can require a certain level of atomicity of operations based on their own application logic. Violation of such application specific logic can, for example, potentially result in data corruption and/or inconsistency.

In connection with a metro configuration discussed elsewhere herein, two storage systems or appliances can synchronously replicate write I/Os directed to a volume V1 to each other. The two storage systems can include two respective instances of V1 both configured to have the same identity of volume V1 when presented or exposed to an external host. Writes to V1 received at a first of the two storage systems are automatically synchronously replicated to a second of the two storage systems, and writes to V1 received at the second storage system are also automatically synchronously replicated to the first storage system. For a metro configuration in at least one embodiment, at any point in time, both the first and second storage systems should have or present to the external host the same data or content for V1 with respect to already acknowledged writes. To guarantee the foregoing, a write to a target logical address range or location can be performed or applied transactionally or atomically. Additionally, multiple concurrent writes to the same one or more logical address should be serialized. For example, consider a client that issues two concurrent write I/Os W1 W2 for the same target location or logical address TA1, where W1 writes content X to TA1 and where W2 writes Y to TA1. In at least one embodiment where W1 and W2 are concurrent (e.g., where W2 is issued before W1 is acknowledged), supported protocols or standards may not define the order in which W1 and W2 are applied such that the client cannot make any assumption about the order in which W1 and W2 are applied. Thus in at least one embodiment, after completion of both W1 and W2, TA1 can be either X or Y.

Now consider a scenario in connection with a metro configuration for the volume V1 including storage systems S1 and S2 where both W1 and W2 are received by S1 and replicated to S2. In a general case without further coordination between S1 and S2, W1 and W2 can be performed independently so the order of execution can differ on S1 and S2 unless additional measures are taken to provide for ensuring that S1 and S2 apply W1 and W2 in the same order. For example without such additional measures or processing to ensure that both S1 and S2 apply W1 and W2 in the same order, TA1 can contain X on S1; and the same logical address TA1 can contain Y on S2.

To prevent such data inconsistency scenarios as noted above such as for a metro configuration, I/O atomicity and serialization of overlapped concurrent I/Os is needed. Such I/O atomicity and serialization of concurrent overlapping I/Os (e.g., where the concurrent I/Os have at least one target logical address in common or overlapping between the concurrent I/Os) can be used to ensure data consistency among both storage systems S1 and S2 of the metro configuration. For example, such I/O atomicity and serialization can ensure that both S1 and S2 present TA1 as storing the same content, either X or Y but the same content or data value.

One way to provide I/O atomicity in a single storage system includes acquiring address locks for the entire target logical address range of an I/O. In this manner, concurrent I/Os having overlapping target addresses (e.g., where the concurrent I/Os are directed to at least one same logical address) can be serialized. Such an approach can be used efficiently in a single node storage system using local locks. However, ensuring needed I/O atomicity and serialization is much more complex in a distributed system where each storage system includes multiple nodes, such as two nodes.

In at least one embodiment, an architecture can be utilized which partitions ownership of the logical address space of user data or content among the multiple processing nodes of a system such as among the nodes A and B 102*a-b* of FIG. 2. Thus, each node can be the owner of a certain subset of user logical addresses. In at least one embodiment, a node assigned a particular logical address LA can be designated as the exclusive owner of the logical address LA. In at least one embodiment, mapping information can be used to map LA to a corresponding physical address or location PA including the content C1 of LA.

Figure 6:
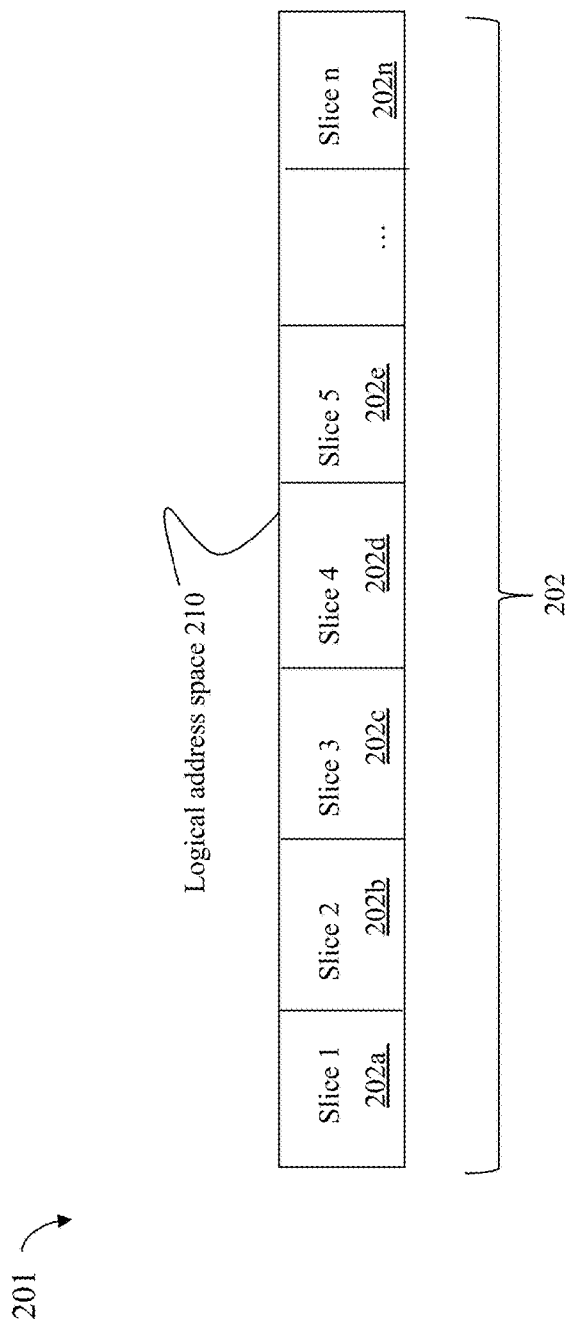
FIGS. 6 and 7 are examples illustrating a partitioned logical address space in at least one embodiment in accordance with the techniques of the present disclosure.

In at least one embodiment in accordance with the techniques of the present disclosure and with reference to the example 201 of FIG. 6, the user data (UD) logical address space 210 can be partitioned into multiple portions 202, such as denoted by multiple logical address portions 202*a-n*. Each of the logical address portions 202*a-n* can be a same size, such as 2 MB (megabytes), 4 MB or any other suitable size. The multiple address space portions 202*a-n* can then be divided among the two nodes in any suitable manner such that a first of the nodes, such as node A, is assigned exclusive ownership of a first set of the logical address portions and a second of the nodes, such as node B, is assigned exclusive ownership of a second set of logical address portions.

The logical address space 210 can denote an associated logical address space of any one or more storage objects or storage space. The one or more storage objects can include, for example, one or more volumes, logical devices or LUNs; one or more sub-LUN portions; and/or one or more file systems. Generally, the logical address space 210 can denote a contiguous range of consecutive logical addresses so that each of the logical address portions 202a-n is mapped to a unique subrange of consecutive logical addresses of the logical address space 210. For example, consider an embodiment where each of the portions 202a-n is 2 MB in size. In this case, the portion 202a can include all logical addresses x in the subrange 0≤x<2 MB; the portion 202b can include all logical addresses x in the subrange 2 MB≤x<4 MB; and so on.

The logical address portions or slices 202 can be partitioned into two sets where each logical address portion is included in only one of the two sets. The logical address portions 202 can be partitioned equally or unequally between the two nodes A and B. For example, in at least one embodiment, the entire logical address range 210 can be divided equally in half, where node A is assigned the exclusive ownership of the portions of a first half of the address range 210, and where node B is assigned the exclusive ownership of the portions of the second half of the address range 210. As another example, the logical address portions or slices 202 can be equally partitioned into two sets such as based on even or odd logical addresses. The first data set assigned to node A can include logical address portions having an associated starting logical address which is even; and the second data set assigned to node B can include logical address portions having an associated starting logical address which is odd.

In at least one embodiment, the logical address portions or slices of the contiguous logical address range can alternate in connection with exclusive ownership assignment among the nodes A and B. For example, the first portion 202a can be assigned to node A, the second portion 202b can be assigned to node B, the third portion 202c can be assigned to node A, the fourth portion 202d can be assigned to node B, and so on. However more generally, ownership of the logical addresses of the logical address space 202 can be partitioned in any suitable manner among the nodes A and B in an embodiment in accordance with the techniques of the present disclosure.

Although particular embodiments are described herein where node A and node B can be assigned ownership of alternating slices such as based on even and odd portion or slice IDs, more generally, the techniques of the disclosure can be used in connection with any suitable technique that assigns logical address or storage object portion ownership among the nodes A and B. Such portions or slices assigned for exclusive ownership to each node can be any suitable size or granularity such as a sub-LUN slice or sub-storage object portion noted above as well as other suitable ownership assignment storage units. For example in at least one embodiment, exclusive ownership can be assigned to nodes A and B by assigning portions or units each corresponding to individual storage objects and/or groups of multiple storage objects.

In at least one embodiment, various types of locks can be supported in connection with a UD logical address or storage granularity such as for a logical block address (LBA), a defined page size, or other suitable storage unit granularity. In at least one embodiment for a UD logical address LA, types of locks can include: a shared lock or read lock of the LA and; an exclusive lock or write lock of the LA. The shared or read lock of an LA allows the holder of the shared lock read access only but not write access to the LA. There can be multiple simultaneous shared locks on the same LA held by different threads, processes or transactions such that all such shared lock holders can simultaneously have read access, but not write access, to the same LA. The write or exclusive lock of an LA allows the holder of the exclusive lock exclusive access to the LA providing the exclusive lock holder exclusive read and write access to the LA. While a reader holds a shared or read lock on an LA, no writer can acquire or hold the exclusive or write lock on the same LA but other readers can acquire a read or shared lock on the same LA. While a writer holds the exclusive or write lock on the LA, no other writer can acquire the write lock on the same LA and no reader can acquire a read lock on the same LA.

For purposes of illustration, assume that nodes A and B are assigned ownership of alternating contiguous logical address portions or slices such as described in connection with FIG. 6. For example with reference back to FIG. 6, logically contiguous address portions or slices can be assigned an integer slice identifier or ID beginning with 1, where subsequent consecutive contiguous logical address portions are assigned subsequent consecutive sequential integer IDs. For example, slice 202a can have a slice ID=1, slice 202b can have a slice ID=2, slice 202c can have a slice ID=3, and so on, where slice 202n can have a slice ID=N (e.g. the Nth integer for the Nth consecutive logical address slice). In at least one embodiment, the logical address slices can be assigned equally (or as equally as possible) among the nodes A and B in an alternating manner such that node A can be assigned as the exclusive owner of all slices having an odd slice ID and node B can be assigned as the exclusive owner of all slices have an even slice ID. In such an embodiment, all slices can be a same size where each volume or storage object can be partitioned into multiple slices.

In at least one embodiment, although I/Os directed to a target location can be received by both the owner node and non-owner node of the target LA, processing associated with an I/O directed to a target location can be performed by the node that owns the target location (or portions thereof) where the owning node acquires local locks for the target location, and where the local locks can be node local locks that are local to the owner node (e.g., having a locking scope within the single owner node). In at least one embodiment, if an initiator node receives an I/O directed to a target location of logical addresses owned entirely by the initiator node, the initiator node can acquire initiator node-local locks for the target location; after acquiring the locks for the target location, the owner initiator node can subsequently service the I/O without requiring internode communication with the peer node; and subsequent to servicing the I/O, the owner initiator can release the locks for the target location.

In at least one embodiment, if the initiator node receives an I/O directed to a target location of logical addresses owned entirely by the peer node, the initiator node can issue an RPC or remote procedure call to the owner peer node over the internode communication link or connection 120 (of FIG. 2) requesting that the owner peer node service the I/O and return any result to the non-owner initiator node. In response to receiving the RPC, the non-owner initiator node can: acquire initiator node-local locks for the target location; service the I/O; release the locks for the target location; and then return to the non-owner initiator node an RPC response denoting an acknowledgement and including any corresponding result that needs to be returned to the host or other storage client that sent the I/O to the initiator node. For a write I/O in at least one embodiment, the RPC response can include an acknowledgement regarding completion of the write I/O. For a read I/O in at least one embodiment, the RPC response can include an acknowledgement regarding completion of the read I/O, and additionally can include content or read data requested by the read I/O, where such read data is to be returned to the host or storage client that issued the read I/O.

In at least one embodiment, consider a first I/O directed to a target location or logical address range including target logical address LA1 of slice 1 and target logical address LA2 of slice 2, where slice 1 is owned by node A and slice 2 is owned by node B. Slice 1 can denote a first consecutive logical address range, slice 2 can denote a second consecutive logical address range, and collectively slices 1 and 2 can form a single contiguous consecutive logical addresses of a storage object. The first consecutive logical address range of slice 1 can denote a lower contiguous address range R1A-R1B; the second consecutive logical address range of slice 2 can denote an upper contiguous address range R2A-R2B; and the single contiguous consecutive logical addresses (e.g., R1A-R1B; R2A-R2B) can range from a lower bound of RIA to an upper bound of R2B. Each of the nodes A and B can be responsible for acquiring local locks and servicing logical addresses owned by the respective nodes. In at least one embodiment in an active-active system, both nodes A and B can receive I/Os.

The foregoing first I/O can be a first host I/O that can be characterized as a cross slice border or cross slice boundary (CSB) I/O directed to a target logical address range including logical addresses in two slices each owned by different nodes. In at least one embodiment of an active-active storage system, either node A or node B can receive the foregoing first host I/O that is a CSB I/O. In at least one embodiment, the initiator node receiving the first host I/O can generally service the first host I/O with respect to target logical addresses owned by the initiator node and can issue an RPC to the peer node to service the first host I/O with respect to other target logical addresses owned by the peer node. In at least one embodiment where the first host I/O is a CSB I/O directed to target location including first logical addresses of slice 1 owned by node A and second logical addresses of slice 2 owned by node B, the initiator node can create two sub-I/Os including IO1 directed to the first logical addresses of slice 1 owned by node A, and including IO2 directed to the second logical addresses of slice 2 owned by node B. The initiator node can service IO1 (if the initiator node is node A) or IO2 (if the initiator node is node B); and the initiator node can send an RPC to the peer node to service the remaining one of IO1 or IO2 not serviced by the initiator node (where the peer node owns the target logical addresses of the remaining IO1 or IO2 not serviced by the initiator). Thus each of the nodes can service either IO1 or IO2 based on logical addresses of the I/O target location owned by each node. In at least one embodiment, servicing the first host I/O that is a CSB I/O can include first locking the entire target logical address range (of both IO1 and IO2) of the target location before proceeding with servicing the first host I/O (e.g., before proceeding with committing or servicing any of IO1 and IO2).

In at least one embodiment, a CSB I/O can be a read I/O or a write I/O. In at least one embodiment if the CSB I/O is a read I/O, then the type of lock operated upon in connection with the target location of the read I/O is a read or shared lock. In at least one embodiment if a CSB I/O is a write I/O, then the type of lock operated upon in connection with the target location of the write I/O is a write or exclusive lock.

In at least one embodiment partitioning ownership of logical addresses among nodes A and B in the same storage system such as described in connection with FIG. 6, locking of the entire target logical address range of an I/O can utilize global locking semantics with node-specific local locks for logical addresses owned by each node, including acquiring node A's local locks for logical addresses owned by node A and acquiring node B's local locks for logical addresses owned by node B. In at least one embodiment where the single host I/O is a CSB I/O having two sub-I/Os, IO1 and IO2 noted above, the initiator node can: acquire local locks for logical addresses of the I/O target logical address range owned by the initiator node; and then send an RPC request to the peer node requesting that the peer, on behalf of the initiator, acquire locks for remaining logical addresses of the I/O target logical address range owned by the peer node. In response, the peer node can perform processing including: acquire the requested locks for logical addresses of the I/O target logical address range owned by the peer node; and return an RPC reply or response to the initiator node acknowledging that the requested remaining logical addresses (that are included in the I/O target logical address range and that are owned by the peer node) are locked. Thus after the foregoing RPC reply is received, the initiator node knows that the entire target logical address range including logical addresses owned by both nodes A and B is now locked. In at least one embodiment, servicing and committing the CSB I/O including IO1 and IO2 can further proceed only after the entire target I/O logical address is locked (e.g., only after the initiator node receives the RPC reply noted above from the peer node). Subsequent to locking the entire target I/O address range, the CSB I/O can be serviced and committed including the initiator node performing either IO1 or IO2 of the CSB I/O (with respect to logical addresses of the target I/O address range owned by the initiator), and including the peer node performing the remaining one of IO1 and IO2 of the CSB I/O (with respect to logical addresses of the target I/O address range owned by the peer node).

In at least one embodiment, a node can receive a CSB I/O, where the CSB I/O is directed to a target location that crosses a slice border between two slices each owned by a different node and where the target location includes logical addresses of the two slices. In such an embodiment, the receiving node or the initiator node the receives the CSB I/O can lock the entire range of logical addresses of the target location prior to servicing the I/O. In at least one embodiment where the target location includes logical addresses of the first portion of the first slice owned by the first node and the second portion of the second slice owned by the second node, the node receiving the CSB I/O can acquire first one or more locks of the first portion of the first slice owned by the first node and can acquire second one or more locks of the second portion of the second slice owned by the second node. In at least one embodiment, the first one or more locks can be local locks of the first node since the corresponding logical addresses of the first portion (and first slice) are owned exclusive by the first node, and the second one or more locks can be local locks of the second node since the corresponding logical addresses of the second portion (and second slice) are owned exclusively by the second node. In at least one embodiment after all locks of the target location of the CSB I/O are acquired by the receiving node, the CSB I/O can be serviced. In at least one embodiment, servicing the CSB I/O can include the first node servicing the first portion of logical addresses of the first slice owned by the first node; and the second node servicing the second portion of the logical addresses of the second slice owned by the second node. In at least one embodiment, the receiving node can return an acknowledgement regarding I/O completion to a host or other storage client that sent the I/O to the receiving node.

In at least one embodiment, the techniques of the present disclosure provide for tracking CSB I/Os that cross slice borders where each of the CSB I/Os is directed to a target location including a first logical address of a first slice owned by the first node and including a second logical address of a second slice owned by the second node. For CSB I/Os, the techniques of the present disclosure can implement cross slice border serialization or synchronization semantics allowing a single concurrent I/O that crosses a particular slice border. In at least one embodiment, processing can track the particular slice border or boundary that is crossed such that only a single concurrent I/O having a target location of logical addresses crossing the particular slice border is allowed to be serviced at a time. In the case of a potential deadlock scenario of multiple concurrent I/Os from both nodes where the multiple concurrent I/Os have corresponding target locations that cross the same slice border, the potential deadlock scenario can be resolved by determining a node winner that is allowed to proceed and a remaining peer node loser that releases any held or acquired locks of the loser node. In at least one embodiment, consider a border B1 between a first slice of first logical addresses and a second slice of second logical addresses, where the first logical addresses form a lower range of contiguous and consecutive logical addresses, where the second logical addresses form an upper range of contiguous and consecutive logical addresses, and where the first and second logical addresses collectively form a consecutive contiguous range of logical addresses. In at least one embodiment, the winner node can be defined by the ownership of the first slice that is "left from the border B1" (e.g., owner node of the lower range of logical addresses), and the loser node can be the remaining peer node owner of the second slice. In at least one embodiment, the border B1 between the first and second slices of consecutive contiguous logical addresses of the same storage object can be denoted using a selected unique logical address that provides for uniquely identifying the cross slice logical address border B1 between the first and second slices. In at least one embodiment, the border B1 between the first and second consecutive contiguous logical address slices can be denoted by the last or largest logical address of the first slice. In at least one embodiment where the storage object is a logical device or volume V1, the border B1 between the first and second consecutive contiguous logical address slices of V1 can be the largest logical block address or largest LBA of the first slice.

In at least one embodiment, each node can track cross slice border I/Os that cross a particular border in a corresponding node-local cross border or cross slice border hash table (CBHT). In at least one embodiment, the CBHT of a node can use a CSB logical address that uniquely identifies the particular border between two corresponding slices where one of the slices is owned by a first node and the remaining slice is owned by the remaining second peer node. In at least one embodiment, the CSB logical address for a border or CSB B1 between first and second slices of logically consecutive contiguous logical addresses can be the largest or last logical address of the first slice, where a first node owns the first slice and a second peer node owns the second slice, where the first slice has a first contiguous range of logical addresses, the second slice has a second range of contiguous logical addresses, and where the first contiguous range of logical addresses are logically and immediately prior to (and consecutive with) the second contiguous range of logical addresses. In at least one embodiment, the CBHT can use unique CSB logical addresses as keys, where the unique CSB logical addresses each uniquely identifying a corresponding cross slice border between two logically consecutive slices each owned by a different one of the nodes.

In at least one embodiment, ownership of address slices can be assigned to the nodes through interleaving in an alternate manner. In at least one embodiment, the slices can be partitioned among the nodes as equally as possible in an alternating manner. In this manner in at least one embodiment, borders can have corresponding predefined or predetermined node winners in an alternating interleaved manner providing a fair and symmetric scheme for resolving a detected potential deadlock between the nodes in connection with multiple concurrent cross slice border I/Os directed to target locations including the same slice border. In at least one embodiment for a border denoting a cross slice border between a first slice owned by a first node and a second slice owned by a second node, the border or CSB can be uniquely identified by the largest logical address in the first slice. In at least one embodiment when a deadlock or potential deadlock is detected with respect to concurrent I/Os issued by the two nodes, the winner can be determined as the owner of the slice that is left of the border such as the owner of the first slice (where the first slice includes logical addresses less than the border).

In at least one embodiment, the techniques of the present disclosure can be used to provide I/O atomicity, synchronization and consistency for CSB I/Os among nodes of a multiple node storage system or appliance. In at least one embodiment, the techniques of the present disclosure can also be used to provide I/O atomicity, synchronization and consistency for CSB I/Os in one or more suitable applications among multiple storage systems or appliances. For example, in at least one embodiment, the techniques of the present disclosure can be used in connection with a metro synchronous replication configuration (sometimes referred to simply as a metro configuration) between two storage systems where each of the two storage systems includes two nodes and can perform processing consistent with the techniques of the present disclosure. In at least one embodiment of a metro configuration, each of the two storage systems can include a separate instance of a storage object such as a logical device or volume V1, where the two instances of V1 on the two storage systems are configured as the same logical device or volume such that the two instances of V1 are configured to have the identity when presented or exposed to an external host over path to the two storage systems. The foregoing two instances of V1 of the metro configuration can be configured for bi-directional or dual synchronous replication, where host writes to instance I1 of V1 on the first storage system are automatically and synchronously replicated to instance I2 of V1 on the second storage system; and where host writes to instance I2 of V1 on the second storage system are automatically and synchronously replicated to instance I1 of V1 on the first storage system. In at least one such embodiment, a first node of the first storage system can receive a write I/O directed to V1 from a host or other storage client, where the first node of the first storage system handles communications with the second storage system. In at least one embodiment of the metro configuration, the techniques of the present disclosure can be used to provide atomicity with respect to the entire target logical address range T1 of the write I/O including: acquiring locks on the entire target logical address range on both storage systems; and responsive to acquiring the locks on both storage systems, then servicing the write I/O on both storage systems. In at least one embodiment of a metro configuration where the write I/O is a CSB I/O that writes to the target logical address range T1 crossing CSB B1, the techniques of the present disclosure can be used in connection with acquiring first locks for T1 on the first storage system, and acquiring second locks for T1 on the second storage system. Responsive to acquiring the foregoing first and second locks across the first and second storage systems, the write I/O can be serviced by the first and second storage systems of the metro configuration. In this manner in at least one embodiment of a metro configuration, the techniques of the present disclosure can be used in connection with providing locking and serialization for the write I/O that is a CSB I/O within each single storage system where the write I/O's target logical address ownership is mixed or split among the two nodes of each single storage system.

In at least one embodiment, each of the two storage systems of the metro configuration can assign exclusive ownership to logical addresses of the target logical address range to the same corresponding nodes. For example, the first storage system can include two nodes A and B where the write I/O's target logical address range T1 includes a first logical address LA1 of slice 1, and a second logical address LA2 of slice 2, where LA1 and LA2 can be consecutive contiguous logical addresses of V1, where slice 1 is owned by node A, and where slice 2 is owned by node B. In a similar manner, the second storage system can also include two nodes C and D where slice 1 is owned by node A, and slice 2 is owned by node D.

The foregoing and other aspects of the techniques of the present disclosure are described in more detail in the following paragraphs.

As used herein in some contexts, specifying that an I/O crosses a slice border or that the I/O is a CSB I/O means that the I/O is directed to a target location or logical address range generally including target logical addresses from two slices each owned by different nodes. In particular in at least one embodiment, specifying that an I/O crosses a slice border or that the I/O is a CSB I/O means that the target location includes a first logical address LA1 of slice 1 owned by a first node and includes a second logical address LA2 of slice 2 owned by a remaining second node, where LA1 and LA2 can be consecutive contiguous logical addresses of the same storage object. Thus in at least one embodiment, a CSB I/O has a target location that spans across two logical consecutive contiguous slices each owned by a different node.

In at least one embodiment, an I/O that does not cross a slice border and therefore only includes target logical addresses owned by a single node does not require locking on the peer node and cannot cause deadlock. In at least one embodiment, any I/O directed to a target location with logical addresses owned only by a single node can be serviced by the single node. In at least one embodiment prior to the single owner node servicing the I/O directed to the target location with logical addresses owned only by the single node, the single owner node can lock logical addresses of the entire target location by acquiring one or more corresponding node-local locks of the single owner node.

In at least one embodiment, tracking of crossed slice borders can be performed for CSB I/Os. For CSB I/Os, crossing slice border serialization semantics can be implemented for each specified slice border to thereby allow only a single concurrent I/O to cross a particular slice border. In at least one embodiment, tracking can be performed for each particular slice border for a CSB I/O that is in progress that crosses that particular slice border.

In the case of concurrent requests or concurrent CSB I/Os from both nodes where the CSB I/Os cross the same slice border, a deadlock or potential deadlock condition can be detected. In response to detecting the deadlock or potential deadlock, processing can be performed that declares a node "winner" and a node "loser". In at least one embodiment consider a first CSB I/O that crosses a slice border B1 from slice 1 owned by a first node to slice 2 owned by a second node, where the first CSB I/O's target location includes LA1 (denoting the highest logical address of slice 1) and LA2 (denoting the lowest logical address of slice 2), where LA1<LA2, and where LA1 and LA2 are consecutive logical addresses of the same storage object. The first node can receive the first CSB I/O, lock LA1 and can issue a first RPC to the second node to lock LA2 owned by the second node. The second node can receive a second CSB I/O that also crosses the same slice border B1. While the first node holds the lock on LA1 and before the first node remotely locks LA2 in response to the first RPC, the second node can lock LA2 and issue a second RPC to the first node to lock LA1 owned by the first node. A deadlock or potential deadlock can result due the first node holding the lock on LA1 which is needed by the second node, and due to the second node holding the lock on LA2 which is needed by the first node.

In at least one embodiment, in the case of concurrent CSB I/Os directed to the same slice border from both nodes (e.g., potential deadlock scenario) such as noted above, a node winner can be defined by ownership of the slice that is left from the slice border or immediately left of the slice border. In at least one embodiment, a slice border B1 denotes a logical border between two logically consecutive and contiguous slices of logical addresses, slice 1 and slice 2, where slice 1 denotes a first contiguous logical address range from logical address R1a to R1b, where slice 2 denotes a second contiguous logical address range from logical address R2a to R2b, and where collectively slice 1 and slice 2 denote a single contiguous logical address range from R1a to R2b (e.g., the first contiguous logical address range or first slice denotes logical addresses that are all lower or less than those of the second contiguous logical address range or the second slice). In at least one embodiment, the border B1 between slices 1 and 2 can be denoted by the logical address R1b, the highest or largest logical address of slice 1, and where R2a denotes the next consecutive logical address following R1b. In at least one embodiment, concurrent CSB I/Os received by the two nodes can cross the same slice border B1 where the node winner can be the particular node that owns the first slice that is to the left of B1 (e.g., where the winner is the node that owns the lower logical addresses of slice 1 left of B1). Thus each CSB has a predefined node winner. As a variation in at least one embodiment, the node winner can be defined by ownership of the slice that is to the immediate right of the border (e.g., the node that owns slice 2, the slice of logical addresses greater than the border B1). The loser aborts its transaction including releasing any held or acquired locks of the transaction. The winner continues processing and is allowed to acquire any locks that it needs including any needed lock(s) just released by the loser node. In the foregoing, the winner and loser nodes are both initiators with respect to corresponding concurrent CSB I/Os received by the nodes where the concurrent CSB I/Os both cross the same slice border and thus where the target locations of such concurrent CSB I/Os overlap.

In at least one embodiment, to detect such a deadlock or potential deadlock scenario such as noted above in connection with concurrent CSB I/Os that cross the same slice border B1, each node can maintain a node local cross border hash table or cross slice border hash table, CBHT, for tracking or recording particular borders or CSBs crossed by CSB I/Os received at the storage system. Generally, the CBHT of a node can track all borders that are crossed by CSB I/Os where each such CSB I/O has a target location that spans over multiple slices. In at least one embodiment, the CBHT can track outstanding in-progress CSB I/Os that cross a slice border. In at least one embodiment, once a CSB I/O crossing a slice border has completed, a CBHT entry corresponding to the slice border can be removed from the CBHT.

In at least one embodiment to avoid or resolve a detected deadlock or potential deadlock, the loser node that received a first CSB I/O crossing the same border B as another second concurrent CSB I/O received by the winner node can: release any locks L acquired for the first CSB I/O; and remove from the loser node's CBHT a CBHT entry corresponding to the particular border B crossed by both the first CSB I/O received by the loser node and the second concurrent CSB I/O received by the winner node. In at least one embodiment, the locks L released by the loser node can include at least one lock L1 that needs to be acquired by the winner node prior to servicing the second concurrent CSB I/O received by the winner node. Since both the first CSB I/O and the second concurrent CSB I/O cross the same slice border B, both such CSB I/Os include target addresses that overlap. Put another way, the first CSB I/O is directed to a first target location and the second concurrent CSB is directed to a second target location, where both the first target location and the second target location include at least some of the same logical addresses spanning across two slices having the cross slice border or border B. For example, if the border B denotes the CSB between slices 202a and 202b of a storage object V1 where X−1 denotes the largest or upper bound logical address of slice 1 202a, and X denotes the lowest or lower bound logical address of the slice 202b, then the first target location of the first CSB I/O can include the logical addresses or LBAs X and X−1 of V1, and the second target location of the second concurrent CSB I/O can also include the logical addresses or LBAs X and X−1 of V1.

In at least one embodiment, for a border or CSB B1 between slice 1 and slice 2, where slice 1 includes logical addresses that are all less than or all lower than logical addresses of slice 2, and where collectively slices 1 and 2 form a single contiguous consecutive logical address range of the same storage object, B1 can be denoted by R1b, the largest logical address of slice 1, noted above. In at least one embodiment, R1b can be used as a key with the CBHT where R1b uniquely identifies the single particular border or CSB B1 crossing from slice 1 to slice 2. For example with reference back to FIG. 6, the logical address X−1 can denote the particular border or CSB B1 from slice 1 202a to slice 2 202b, where slice 1 202a has an associated first logical address range from 0 to X−1, and where slice 2 202b has an associated second logical address range from X to 2X−1. Additionally, the logical address 2X−1 can denote the particular border or CSB B2 between slices 202a and 202b. In this example, the value of the logical address X−1 can be used as the value of the key K in the CBHT for the border B1 between slices 202a and 202b. In at least one embodiment, key values of the CBHT corresponding respectively to unique CSBs or borders between slices can be mapped, such as by a hash function, to a corresponding index or entry of the CBHT. In at least one embodiment, a hash function HF can take as an input the value of a particular key K corresponding to a logical address denoting a particular border B1, where the hash function HF can produce as an output a corresponding hash value HV1 that can be mapped to, or can denote, a particular index I of the CBHT. The foregoing can be represented as HF (K)=HV1, where HV1 can denote or be mapped to a particular index I of the CBHT.

Figure 7:
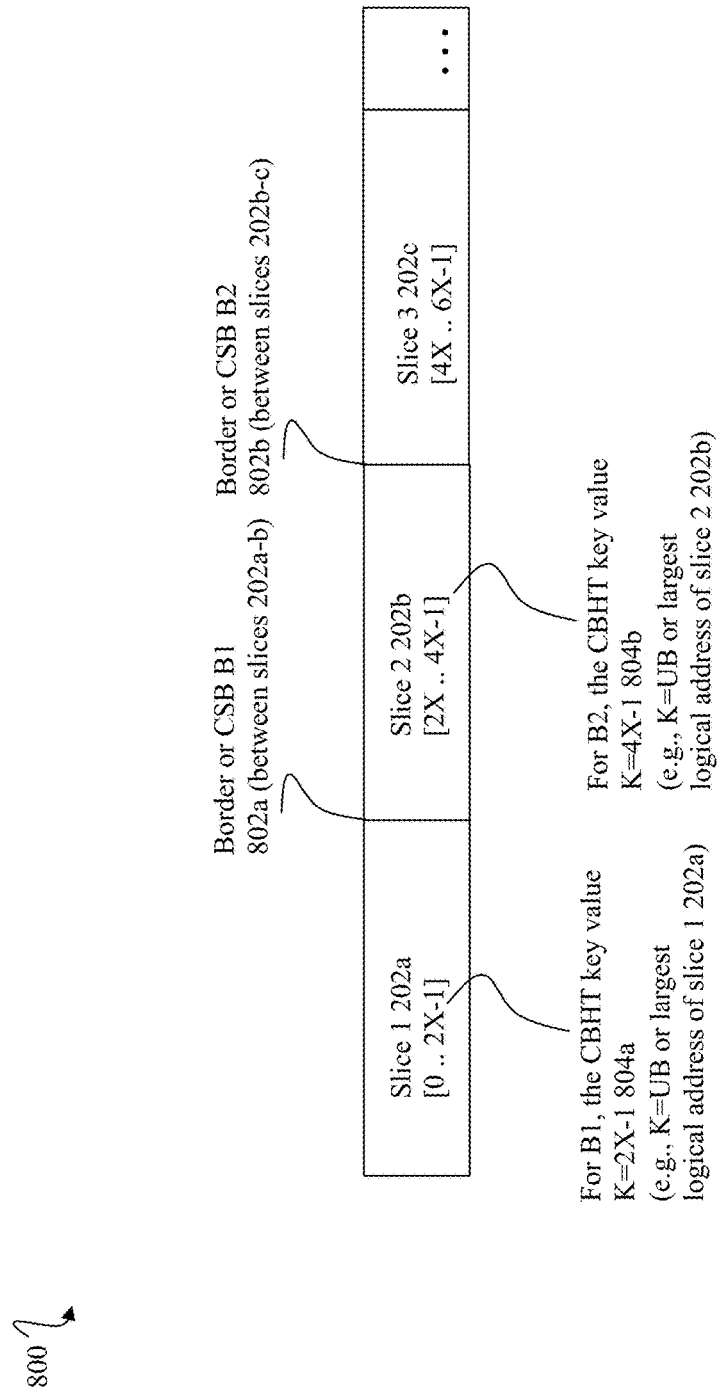

Referring to FIG. 7, shown is an example 800 illustrating key values that can be used to denote borders or CSBs between two slices in at least one embodiment in accordance with the techniques of the present disclosure.

For illustration, the example 800 includes only 3 slices 202a-c as in FIG. 6 where each slice is generally of size 2X. Slice 1 202a can have an associated consecutive contiguous logical address range from 0 to 2X−1. Slice 2 202b can have an associated consecutive contiguous logical range from 2X to 4X−1. Slice 3 202c can have an associated consecutive contiguous logical range from 4X to 6X−1. As denoted by the element 802a, B1 can denote the border or CSB between slices 202a-b. The element 804a indicates that for B1 802a, the CBHT key value K=2X−1, where 2X−1 is the upper bound (UB) or largest logical address of slice 1 202a. As denoted by the element 802b, B2 can denote the border or CSB between slices 202b-c. The element 804b indicates that for B2 802b, the CBHT key value K=4X−1, where 4X−1 is the UB or largest logical address of slice 1 202a.

Figure 8:
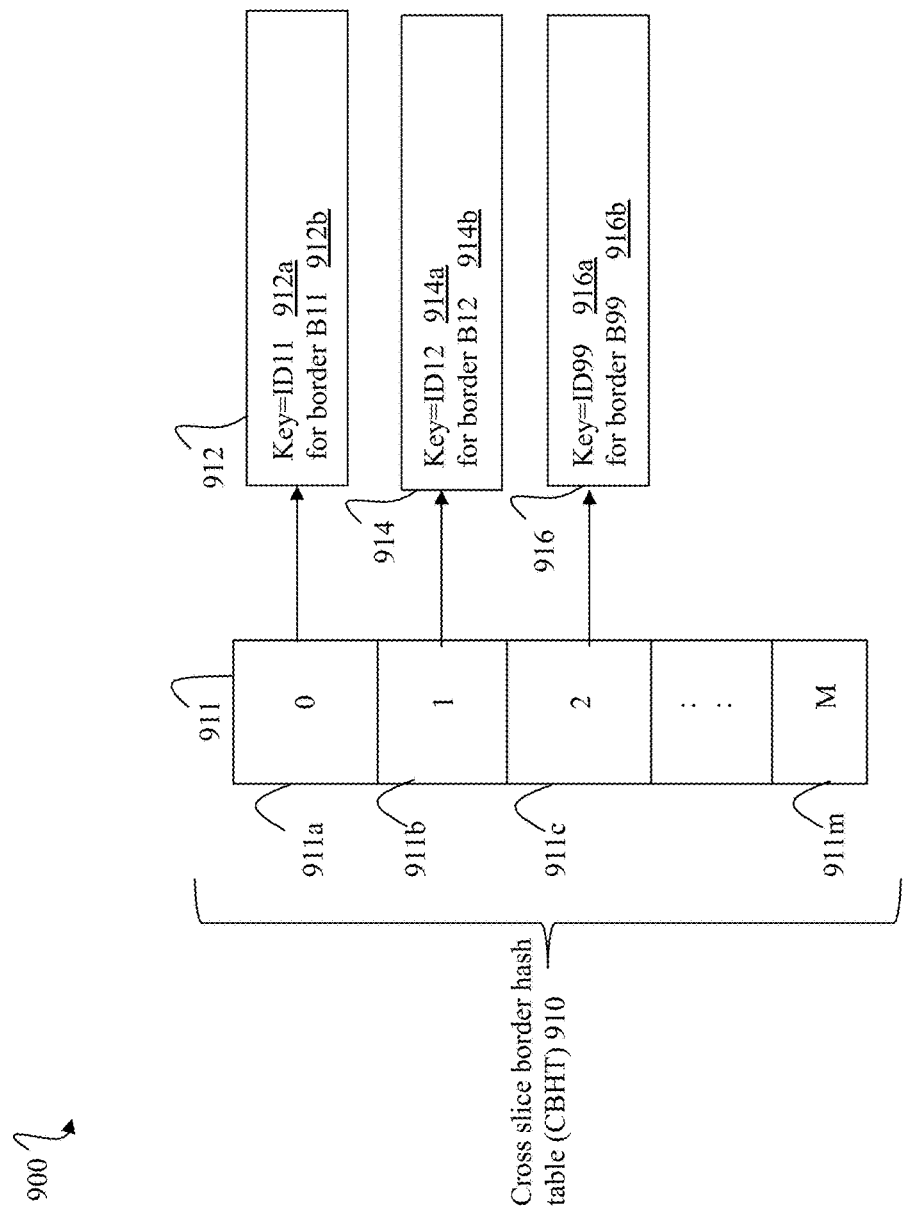
FIG. 8 illustrates a cross slice border hash table that can be used in at least one embodiment in accordance with the techniques of the present disclosure.

Referring to FIG. 8, shown is an example 900 of a CBHT that can be used in at least one embodiment in accordance with the techniques of the present disclosure.

The example 900 includes the CBHT 910 with M hash lines or indices 911.

Hash line or index 0 911a is associated with entry 912 denoting that entry 912 represents a CBHT entry of a CBHT key K=ID11 that maps to CBHT index 0. The entry 912 is inserted into the CBHT 910 for the border B11 (912b) having the corresponding key K=ID11 (912a). For two consecutive logical address slices A-B having the corresponding cross slice border or border B11 denoted by entry 912, the ID11 of 912a can denote the upper bound or largest address of slice A, where when slices A-B are viewed as a single collective contiguous logical address range AB, slice A forms the lower address range and slice B forms the upper address range of the single collective contiguous logical address range AB.

Hash line or index 1 911b is associated with entry 914 denoting that entry 914 represents a CBHT entry of a CBHT key K=ID12 that maps to CBHT index 1. The entry 914 is inserted into the CBHT 910 for the border B12 (914b) having the corresponding key K=ID12 (914a). For two consecutive logical address slices C-D having the corresponding cross slice border or border B12 denoted by entry 914, the ID12 of 914a can denote the upper bound or largest address of slice C, where when slices C-D are viewed as a single collective contiguous logical address range CD, slice C forms the lower address range and slice D forms the upper address range of the single collective contiguous logical address range CD.

Hash line or index 2 911c is associated with entry 916 denoting that entry 916 represents a CBHT entry of a CBHT key K=ID99 that maps to CBHT index 3. The entry 916 is inserted into the CBHT 910 for the border B99 (916b) having the corresponding key K=ID99 (916a). For two consecutive logical address slices E-F having the corresponding cross slice border or border B99 denoted by entry 916, the ID99 of 914a can denote the upper bound or largest address of slice E, where when slices E-F are viewed as a single collective contiguous logical address range EF, slice E forms the lower address range and slice F forms the upper address range of the single collective contiguous logical address range EF.

Hash line or index M 911m is currently not associated with any entries denoting that there is currently no CBHT entry associated with a cross slice border or border having an associated key that maps to the CBHT index M.

In at least one embodiment, the CBHT can be organized as a hash table where a key K is mapped to a particular CBHT index 911 using a hash function HF. In at least one embodiment, each of the CBHT indices 911a-m can be associated with a linked list of 0 or more corresponding CBHT entries having key values that are mapped by the hash function HF to a corresponding one of the indices 911a-m. The hash function HF can take as an input a key K, denoted as HF (key), that generates a hash value HV1 based on the key K, where HV1 is mapped to one of the indices 911a-m. For example, for entry 912 HF(ID11)=0; for entry 914 HF(ID12)=1; and for entry 916 HF(ID99)=2.

In at least one embodiment, a CBHT can hold multiple entries for the same key or slice border where each of the multiple entries for the same key denotes a concurrent CSB I/O with the same slice border.

In at least one embodiment, a CSB I/O can be a read I/O or a write I/O. In at least one embodiment if the CSB I/O is a read I/O, then the type of lock operated upon in connection with the target location of the read I/O is a read or shared lock. In at least one embodiment if a CSB I/O is a write I/O, then the type of lock operated upon in connection with the target location of the write I/O is a write or exclusive lock.

Figure 9B:
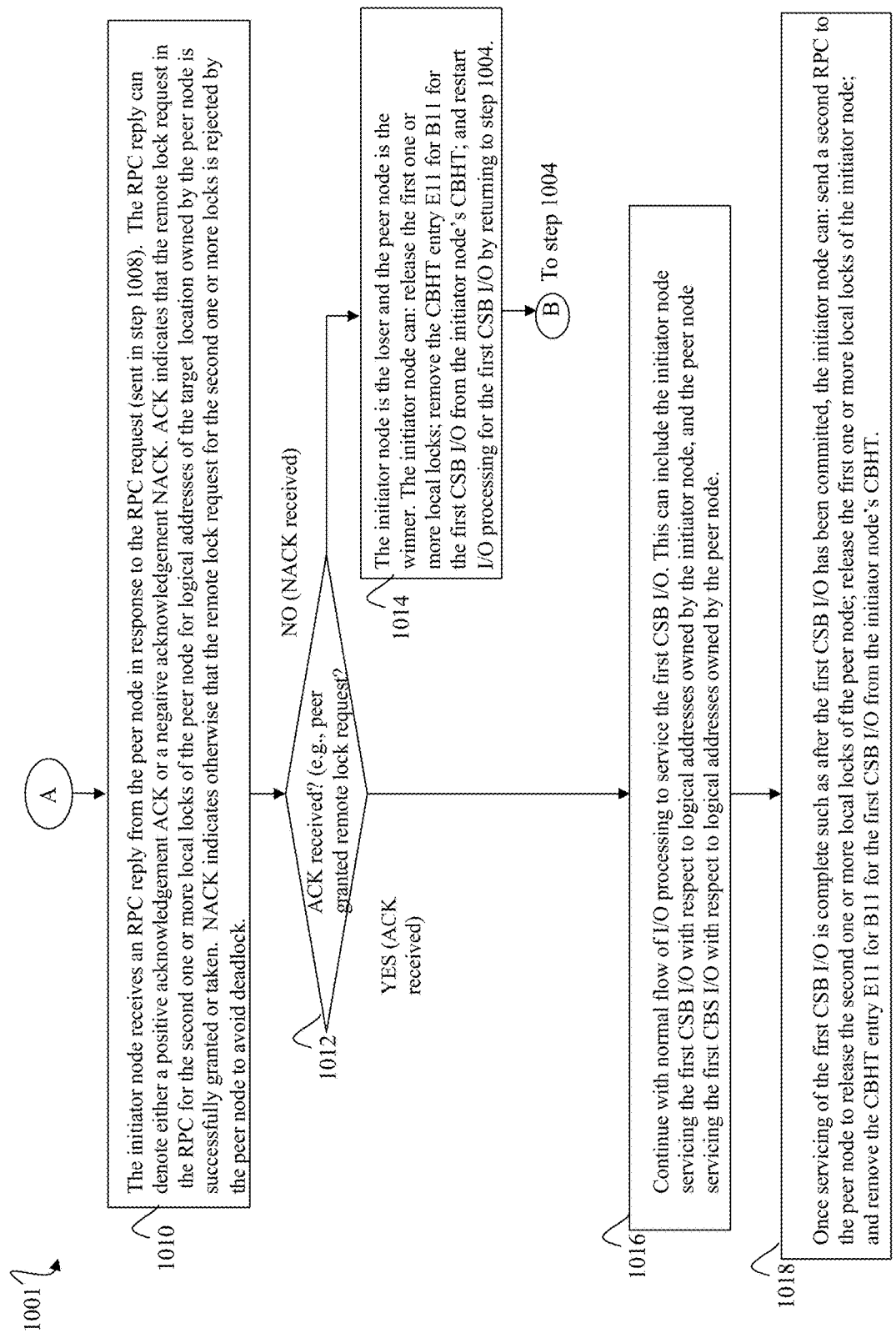

Referring to FIGS. 9A and 9B, shown is a flowchart 1000, 1001 of processing steps that can be performed in at least one embodiment in accordance with the techniques of the present disclosure. The processing of FIGS. 9A and 9B can be performed by an initiator node in connection with a CSB I/O received by the initiator node.

At the step 1002, an initiator node of a storage system receives a first CSB I/O directed to a target location that crosses a slice border B11 between two slices Y1 and Y2. The target location includes logical addresses spanning the two slices Y1 and Y2 each owned by a different node in the dual node storage system. Each of the two slices Y1, Y2 can denote a consecutive contiguous logical address range, and collectively, the two slices can form a single contiguous logical address range CR of the same storage object such as a same logical device or volume V1. Y1 can be owned by a first node Y2 can be owned by a remaining second node. The target location can include a first set S1 of logical addresses of slice Y1 owned by the first node and can include a second set S2 of logical addresses of slice Y2 owned by the second node. The initiator node that received the CSB I/O can generally be either the first node or the second node. Slice Y1 can have a first consecutive logical address range R1 having a lower bound (LB) logical address of R1a and an upper bound (UB) logical address of R1b. Slice Y2 can have a second consecutive logical address range R2 with a LB address of R2a and an UB logical address of R2b. R1 can denote a lower address range than R2 such that each logical address of R1 is less than each logical address of R2. The single contiguous logical address range CR can have an associated LB=R1a and an associated UB=R2b.

The slice border or CSB B11 between the slices Y1 and Y2 can be denoted by R1b, the largest or last logical address of the slice Y1 having the lower address range relative to the two slices Y1 and Y2. From the step 1002, control proceeds to the step 1004.

At the step 1004, the initiator node adds a CBHT entry E11 for B11 for the first CSB I/O to the initiator node's CBHT, where E11 is associated with CBHT index I1. The border or CSB B11 can have an associated key=R1b that is mapped using a hash function HF to a particular index I1 of the CBHT, where HF (R1b)=HV1, where HV1 is mapped to, or denotes, I1. From the step 1004, control proceeds to the step 1006.

At the step 1006, the initiator node acquires first one or more local locks of the initiator node for all owned logical addresses related to the first CSB I/O (e.g., all logical addresses of the target location that are owned by the initiator node). If the initiator node is the first node that owns the slice Y1 and thus the logical addresses of S1, then the initiator node acquires the first one or more local locks for logical addresses S1. If the initiator node is the second node that owns the slice Y2 and thus the logical addresses of S2, then the initiator node acquires the first one or more local locks for logical addresses S2. From the step 1006, control proceeds to the step 1008.

At the step 1008, the initiator node sends an RPC request to the peer node to acquire second one or more local locks of the peer node for all remaining logical addresses of the target location that are owned by the peer node. If the peer node is the first node that owns the slice Y1 and thus the logical addresses of S1, then the RPC is a request by the initiator node to acquire the second one or more locks for logical addresses S1 owned by the peer node. If the peer node is the second node that owns the slice Y2 and thus the logical addresses of S2, then the RPC is a request by the initiator node to acquire the second one or more locks for logical addresses S2 owned by the peer node. The RPC can identify: the particular CSB B11 such as by including B11's unique CBHT key=R1b, the logical addresses for which the initiator node is requesting to lock/acquire peer node's local locks, and the lock type requested. From the step 1008, control proceeds to the step 1010.

At the step 1010, the initiator node receives an RPC reply from the peer node in response to the RPC request (sent in step 1008). The RPC reply can denote either a positive acknowledgement ACK or a negative acknowledgement NACK. ACK indicates that the remote lock request in the RPC for the second one or more local locks of the peer node for logical addresses of the target location owned by the peer node is successfully granted or taken. NACK indicates otherwise that the remote lock request for the second one or more locks is rejected by the peer node to avoid deadlock. From the step 1010, control proceeds to the step 1012.

At the step 1012, the initiator determines whether an ACK or positive acknowledgement is received as the RPC reply from the peer node where the ACK indicates that the peer granted the initiator node's remote lock request of the RPC request for the second one or more local locks of the peer node per the RPC request.

If the step 1012 evaluates to yes where an ACK is received at the initiator node from the peer node in response to the RPC request (sent in step 1008), control proceeds to the step 1016.

At the step 1016, processing can continue with normal flow of I/O processing to service the first CSB I/O. This can include the initiator node servicing the first CSB I/O with respect to logical addresses owned by the initiator node, and the peer node servicing the first CBS I/O with respect to logical addresses owned by the peer node. From the step 1016, control proceeds to the step 1018.

At the step 1018, once servicing of the first CSB I/O is complete such as after the first CSB I/O has been committed, the initiator node can: send a second RPC to the peer node to release the second one or more local locks of the peer node; release the first one or more local locks of the initiator node; and remove the CBHT entry E11 for B11 for the first CSB I/O from the initiator node's CBHT.

If the step 1012 evaluates to no, where a NACK rather than an ACK is received at the initiator node from the peer node in response to the RPC request (sent in step 1008), control proceeds to the step 1014.

If the step 1012 evaluates to no, it means that there is contention for the border B11 with another second concurrent CSB I/O directed to the same border B11 as the first CSB I/O. As a result, the peer node detected this contention between the first and second CSB I/Os with respect to the same border B11 and has performed processing to avoid or resolve any deadlock or potential deadlock. As a result of such processing performed by the peer node, the peer node has determined a winner node and loser node with respect to the concurrent first and second CSB I/Os both crossing the same border B11, where the initiator node is the loser and the peer node is the winner, and where the peer node accordingly returned the NACK rather than the ACK in response to the initiator node's RPC request (sent in the step 1008). As a result, control is transferred from the step 1012 to the step 1014. At the step 1014, the initiator node, as the loser with respect to the foregoing contention with multiple CSBs crossing the same border B11, can: release the first one or more local locks; remove the CBHT entry E11 for B11 for the first CSB I/O from the initiator node's CBHT; and restart I/O processing for the first CSB I/O by returning to step 1004. From the step 1014, control returns to the step 1004.

Figure 10A:
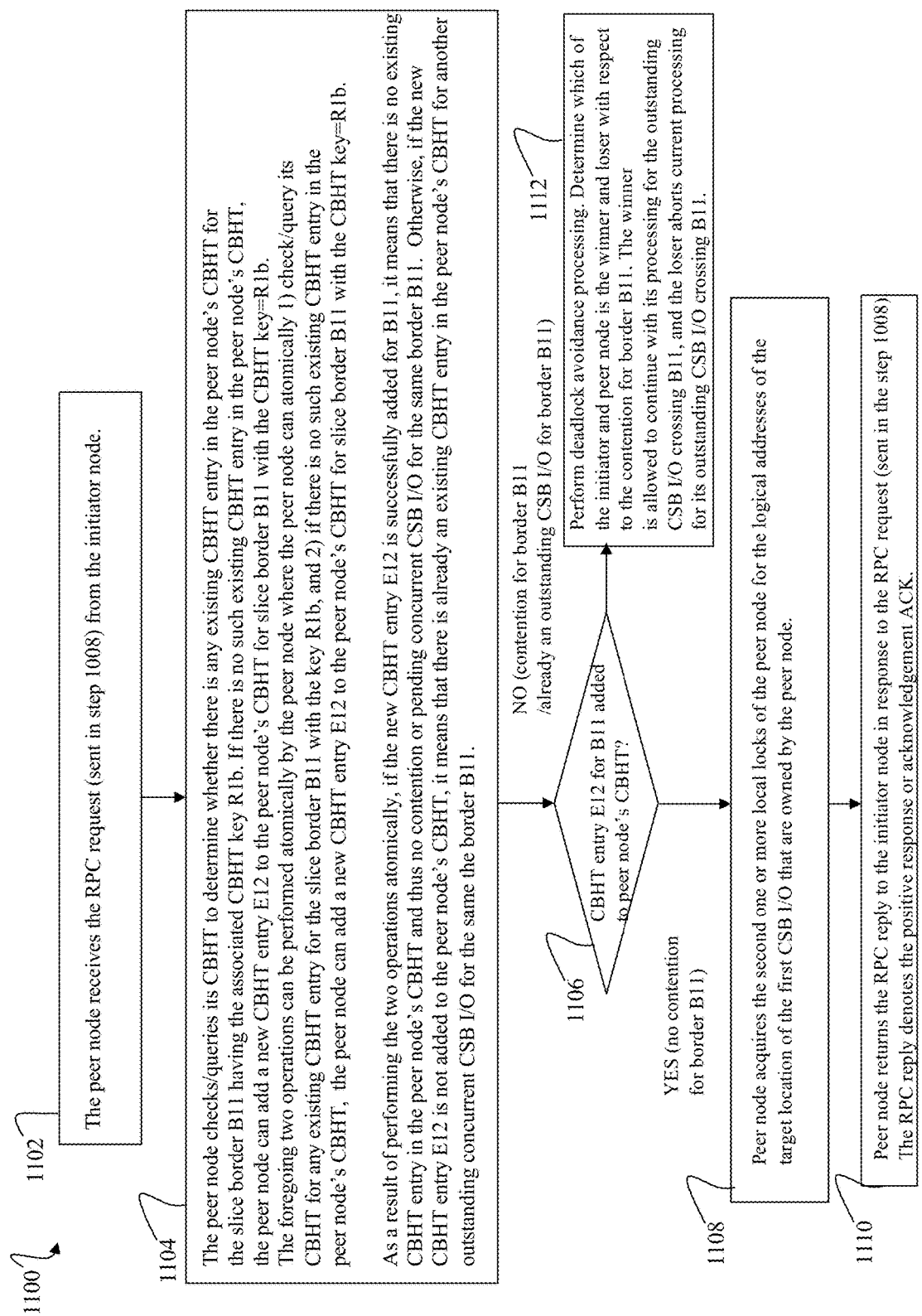

Referring to FIG. 10A, shown is a flowchart 1100 of processing that can be performed in at least one embodiment in accordance with the techniques of the present disclosure. The steps of FIG. 10A can be performed by the peer node such as with respect to the first CSB I/O received by the initiator node. The steps of FIG. 10A can be performed by the peer node in response to receiving the RPC request (sent in the step 1008) from the initiator node.

At the step 1102, the peer node receives the RPC request (sent in step 1008) from the initiator node. From the step 1102, control proceeds to the step 1104.

At the step 1104, the peer node checks/queries its CBHT to determine whether there is any existing CBHT entry in the peer node's CBHT for the slice border B11 having the associated CBHT key R1b. If there is no such existing CBHT entry in the peer node's CBHT, the peer node can add a new CBHT entry E12 to the peer node's CBHT for slice border B11 with the CBHT key=R1b. In at least one embodiment, the foregoing two operations can be performed atomically by the peer node where the peer node can atomically 1) check/query its CBHT for any existing CBHT entry for the slice border B11 with the key R1b, and 2) if there is no such existing CBHT entry in the peer node's CBHT, the peer node can add a new CBHT entry E12 to the peer node's CBHT for slice border B11 with the CBHT key=R1b.

As a result of performing the two operations atomically, if the new CBHT entry E12 is successfully added for B11, it means that there is no existing CBHT entry in the peer node's CBHT and thus no contention or pending concurrent CSB I/O for the same border B11. Otherwise, if the new CBHT entry E12 is not added to the peer node's CBHT, it means that there is already an existing CBHT entry in the peer node's CBHT for another outstanding concurrent CSB I/O for the same the border B11. From the step 1104, control proceeds to the step 1106.

At the step 1106, a determination is made as to whether the CBHT entry E12 for B11 was successfully added (in step 1104) to peer node's CBHT. If the step 1106 evaluates to yes, it means that there is no contention at the border B11 such that there is no other outstanding concurrent CSB I/O crossing the same border B11 as the first CSB I/O. Alternatively, if the step 1106 evaluates to no, it means that there is contention at the border B11 such that there is at least one other outstanding concurrent CSB I/O crossing the same border B11 as the first CSB I/O.

If the step 1106 evaluates to yes (no contention at border B11 for multiple concurrent outstanding CSBs crossing the same border B11), control proceeds to the step 1108.

At the step 1108, the peer node acquires the second one or more local locks of the peer node for the logical addresses of the target location of the first CSB I/O that are owned by the peer node. From the step 1108, control proceeds to the step 1110.

At the step 1110, the peer node returns the RPC reply to the initiator node in response to the RPC request (sent in the step 1008). The RPC reply denotes the positive response or acknowledgement ACK.

If the step 1106 evaluates to no (there is contention at border B11 for multiple concurrent outstanding CSBs crossing the same border B11, control proceeds to the step 1112.

At the step 1112, deadlock avoidance or resolution processing can be performed by the peer node. At the step 1112 as part of deadlock avoidance or resolution processing, the peer node can determine which of the initiator and peer node is the winner and loser with respect to the contention among the multiple outstanding concurrent CSB I/Os crossing the same border B11. The multiple outstanding concurrent CSB I/Os crossing the same border B11 can include the first CSB I/O as received by the initiator node and a second CSB I/O received by the peer node (where the peer node serves as the initiator node for the second CSB I/O and accordingly performs processing of FIGS. 9A and 9B in connection with the second CSB I/O). Processing is allowed to continue for the winner node's corresponding outstanding CSB I/O crossing B11 (e.g., where the winner node received its corresponding outstanding CSB I/O crossing B11 and where the winner node is the initiator for its received corresponding outstanding CSB I/O). The loser node aborts current processing for its corresponding outstanding CSB I/O crossing B11 (e.g., where the loser node received its corresponding outstanding CSB I/O crossing B11 and where the loser node is the initiator for its received corresponding outstanding CSB I/O).

Figure 10B:
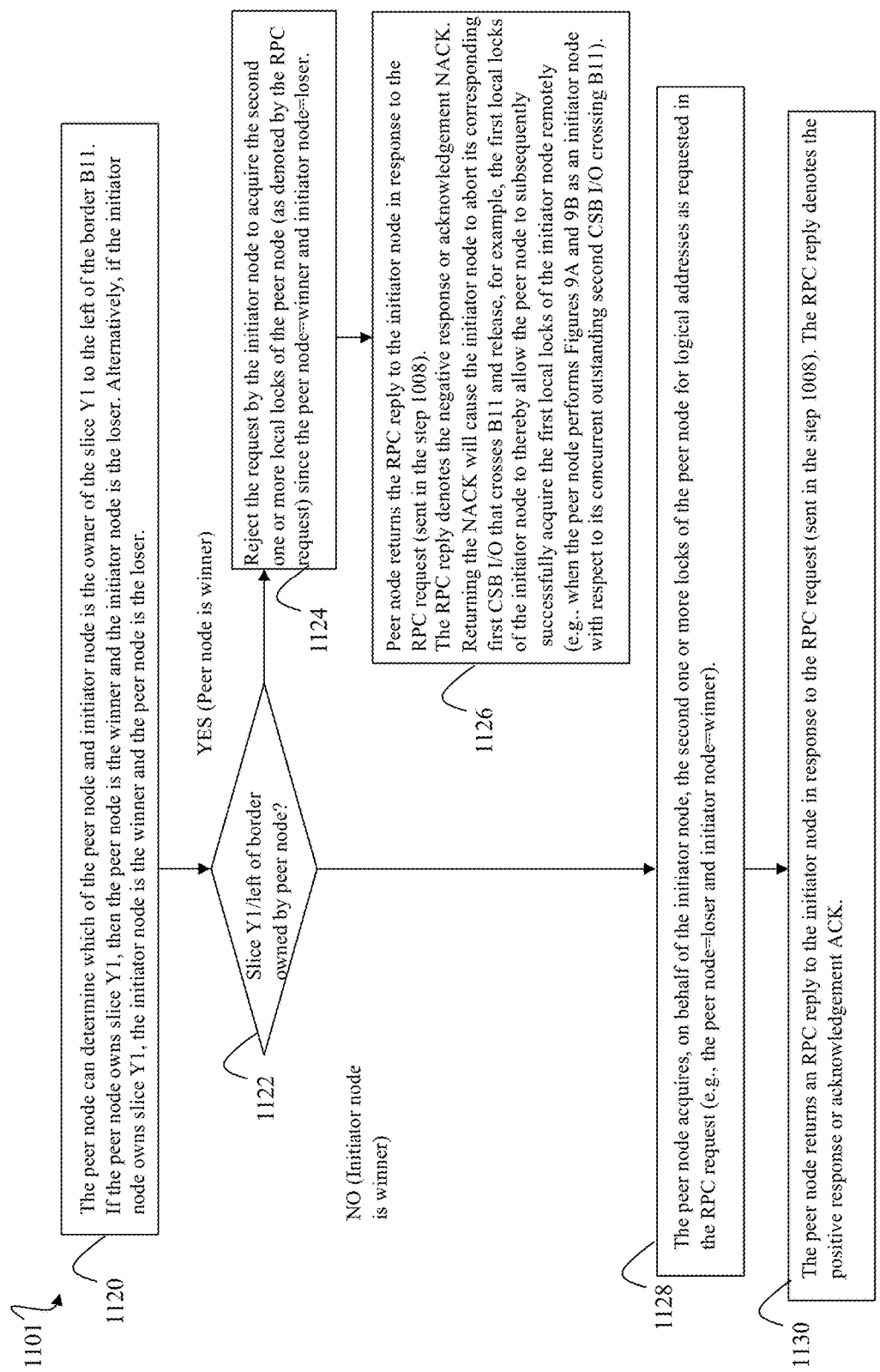

Referring to FIG. 10B, shown is a flowchart 1101 of processing steps that can be performed in at least one embodiment in accordance with the techniques of the present disclosure. The flowchart 1101 provides further details regarding processing that can be performed in connection with the step 1112 of FIG. 10A.

At the step 1120, the peer node can determine which of the peer node and initiator node is the owner of the slice Y1 to the left of the border B11. If the peer node owns slice Y1, then the peer node is the winner and the initiator node is the loser. Alternatively, if the initiator node owns slice Y1, the initiator node is the winner and the peer node is the loser. From the step 1120, control proceeds to the step 1122.

At the step 1122, a determination is made as to whether the slice Y1 that is left of the border B11 is owned by the peer node. In at least one embodiment, the slice Y1 that is left of the border B11 can have corresponding logical addresses less than the unique CBHT key K identifying B11, and where the CBHT key K identifying B11 can be a logical address that is owned by a predetermined one of the nodes, where the predetermined one of the nodes is selected or determined as the winner node.

If the step 1122 determines that the slice Y1 is owned by the peer node such that the peer node is the winner, control proceeds to the step 1124.

At the step 1124, the peer node rejects the request by the initiator node to acquire the second one or more local locks of the peer node (as denoted by the RPC request) since the peer node is the winner and initiator node is therefrom the loser. From the step 1124, control proceeds to the step 1126.

At the step 1126, the peer node returns the RPC reply to the initiator node in response to the RPC request (sent in the step 1008). The RPC reply denotes the negative response or acknowledgement NACK. Consistent with processing discussed elsewhere herein (e.g., initiator node processing of FIGS. 9A and 9B), returning the NACK will subsequently cause the initiator node to abort its corresponding first CSB I/O that crosses B11 and release, for example, the first local locks of the initiator node to thereby allow the peer node to subsequently successfully acquire the first local locks of the initiator node remotely (e.g., when the peer node performs FIGS. 9A and 9B as an initiator node with respect to its concurrent outstanding second CSB I/O crossing B11).

If the step 1122 determines that the slice Y1 is owned by the initiator node such that the initiator node is the winner, control proceeds to the step 1128.

At the step 1128, the peer node acquires, on behalf of the initiator node, the second one or more locks of the peer node for logical addresses as requested in the RPC request (e.g., the peer node=loser and initiator node=winner). From the step 1128, control proceeds to the step 1130.

At the step 1130, the peer node returns an RPC reply to the initiator node in response to the RPC request (sent in the step 1008). The RPC reply denotes the positive response or acknowledgement ACK.

The processing described above in connection with FIGS. 9A, 9B, 10A and 10B can be generally applied for use in connection with multiple concurrent CSB I/Os that can cross the same CSB or slice border such as B11.

In at least one embodiment to accommodate the multiple concurrent CSB I/Os crossing the same border or CSB B11, each node's CBHT can allow for multiple CBHT entries for the same CBHT key K, where the CBHT key K uniquely identifies the CSB B11. Consistent with discussion herein each such multiple concurrent CSB I/O directed to the same CSB B11 is added as a CBHT entry of the same list of CBHT entries associated with a particular one of the CBHT indices I1, where HF(I)=HV1, where HV1 is further mapped to I1.

In at least one embodiment, each time an initiator node receives a CSB I/O that crosses a slice border B13 uniquely identified by key K13, processing of step 1104 of FIG. 9A can add a corresponding new CBHT entry to the initiator node's CBHT. CBHT entries for other outstanding concurrent I/Os that cross the same slice border B13 can already exist in the initiator node's CBHT when the new CBHT entry is added as a new entry or element of the same list of CBHT entries associated with the same CBHT index I13 that maps to the crossed slice border B13 having the corresponding key K13. Alternatively in at least one embodiment, instead of having multiple CBHT entries for the same slice-border B13 when there are multiple concurrent outstanding CSB I/Os crossing the same slice border B13, a refcount or reference count field can be added to the CB_HT entry. Rather than have multiple CBHT entries corresponding to multiple concurrent CSB I/Os that cross the same slice border B13, the CBHT of a node can have a single CBHT entry with a refcount field tracking or denoting the current number of outstanding concurrent CSB I/Os that cross the slice border B13. In at least one embodiment using the refcount field, the refcount can be incremented by one rather than add a new corresponding CBHT entry into a node's CBHT as discussed in connection with the above processing (e.g., FIGS. 9A, 9B, 10A and 10B). Thus, for example, the initiator node processing at step 1004 of FIG. 9A can increment the refcount of a first CBHT entry each time the initiator node receives a CSB I/O that crosses a slice border corresponding to the first CBHT entry. Additionally in at least one embodiment, the peer node can similarly increment the refcount of a corresponding CBHT entry of the peer node's CBHT in the step 1104 of FIG. 10A. In a similar manner, rather than remove a CBHT entry from a node's CBHT table as discussed above, the refcount of the corresponding CBHT entry can be decremented by one. Thus in at least one embodiment, rather than remove a CBHT entry from an initiator node's CBHT table such as in connection with the FIG. 9B, a corresponding refcount of a CBHT entry can be decremented by one. In at least one embodiment, when the refcount of a CBHT entry reaches 0, the CBHT entry can be removed.

In at least one embodiment, one or more optimizations can be performed to further improve fairness in connection with determining a winner and a loser in connection with deadlock avoidance or resolution processing such as performed in connection with FIGS. 10A and 10B (e.g., step 1112 of FIG. 10A and FIG. 10B). In at least one embodiment using a refcount field to track the number of concurrent outstanding CSBs crossing the same slice border, to provide fairness in cases where the are many CSB I/Os directed to the same slice border or CSB, the winner identity or role can be switched between nodes as will now be discussed. In at least one embodiment, the CBHT entry can be extended to also include the following fields: "status", "last_winner", and a "stale timestamp". Generally, when a CBHT entry is created: the "status" can be "active" as a default; the "last_winner" can be set to a first node denoting the particular node that owns the slice on the left side of the border (as discussed above); and the "stale timestamp" can be invalid or denote an invalid time. When a CBHT entry for a slice border or CSB B13 is about to be removed from the CB_HT of a node such as when the entry's refcount reaches 0, instead of removal, the CBHT entry can remain in the CB_HT with a "stale" status, and the "stale timestamp" can be updated with the current time. If a new CSB I/O crossing the same slice border B13 is received by the node during a specified "stale" time period (e.g., a specified time window or time period measured from the "stale timestamp" field): i). the CBHT entry's status can be changed to "active" and the "stale timestamp" can be invalidated; and ii). the last_winner can be switched or updated from the first node to the remaining second node. In this manner, the "last winner" field can denote the current node that will be declared the winner in connection with any deadlock scenarios in connection with the corresponding cross slice border B13 such as part of deadlock avoidance or resolution processing as described herein. The foregoing can be repeated such that the "last winner" field can again be updated from one node to the other remaining node.

In connection with the foregoing in at least one embodiment, a node can generally track (e.g., in the last winner field) in a CBHT entry for a particular slice border B13 which of the two nodes should be declared the winner in connection with any deadlock scenarios (e.g., when the node is performing peer node workflow processing such as in connection with FIGS. 10A and 10B). Initially when the CBHT entry is created, the last winner field can be set to the first node owning the slice that is left of the border B13. Rather than remove the CBHT entry for CSB B13 such as when the CBHT entry's refcount reaches 0, when the CBHT's refcount reaches 0, the CBHT entry's status can be updated to "stale" and the stale timestamp can be updated to the current time. If the node receives a CSB I/O crossing CSB B13 within a specified amount of time or time window (e.g., the stale" time period) measured from the point in time denoted by the stale time stamp field, then 1) the CBHT entry's status can be updated to active and the stale time stamp field can be invalidated (e.g., updated to denote an invalid time); and 2) the CBHT entry's last winner field can be updated or switched from its current value denoting a first of the two nodes to a revised value denoting the other remaining second of the two nodes.

In at least one embodiment in connection with the above-noted fairness optimization, processing can be performed to periodically traverse each node's CBHT to remove stale CBHT entries after the stale time period (as measured from the stale timestamp field) has elapsed or expired.

In at least one embodiment as a further optimization to provide fairness when determining a winner and a loser in scenarios of a burst of CSB I/Os directed to the same slice border B13, each node can maintain a "win_count" in the CB_HT entry corresponding to the slice border B13, where win_count can count or track the number of times a particular one of the nodes currently denoted by "last winner" has actually been declared a winner in connection with deadlock avoidance or resolution processing for a deadlock condition with the other node. When the win_count" reaches to some predefined threshold, the "last_winner" may be switched or updated from a first of the two nodes to the remaining second of the two nodes. For example, if the last_winner denotes node A and node A has actually been selected as the winner in connection with deadlock avoidance or resolution processing N times (where win_count=N), and N=THRESH1 (the predefined threshold), the last_winner field can be updated to alternatively specify node B and the win_count can be reset to 0. Subsequently, node B can be declared the winner of any deadlock scenarios in connection with the slice border B13 until, for example, the win count again reaches the specified threshold THRESH1. In at least one embodiment, the foregoing can be repeatedly performed such that each node can be declared the winner by a peer node a threshold number of times in a row and then the winner switches to the other node.

The techniques of the present disclosure as discussed above provide for execution of I/Os, including CSB I/Os, atomically in an efficient manner. The techniques of present disclosure as discussed above generally provide a reduction in complexity of I/O processing relative to other potential alternatives. Additionally, the techniques of the present disclosure as discussed above provide for fairness in determining a winner and a loser as part of deadlock avoidance or resolution processing in connection with CSB I/Os (e.g., I/Os that cross slices, or have a target location spanning across two slices each owned exclusively by a different one of the two nodes). In at least one embodiment in a dual node storage system or appliance, the techniques of the present disclosure provide for a balanced approach and for taking distributed locks across both nodes of the system for CSB I/Os. In at least one embodiment in an active-active dual node storage system or appliance where both nodes can receive and service I/Os, UD logical addresses can be partitioned between the two nodes such that each node exclusively owns a different portion or subset of the UD logical addresses. In at least one such embodiment, if an I/O directed to a target location is received by a node that owns the entire logical address range of the target location, the receiving or initiator node can service the I/O entirely locally on the receiving node, including locking the entire target location logical address range using local locks of the receiving node, and where such distributed locks can be taken only for CSB I/Os. In at least one embodiment for a CSB I/O directed to a target location, both nodes exclusively own a different logical address space portion of the target location, where each owning node can hold the local locks for its logical address space portion and each node can service the CSB I/O with respect to the target location logical address space portion owned exclusively by the node.

The techniques of the present disclosure are described above with respect to an embodiment including a single dual node active-active storage system or appliance where generally both nodes can receive and service I/Os. More generally, the techniques of the present disclosure can be further extended and utilized in embodiments and applications such as those including multiple storage systems or appliances. In at least one embodiment, each of the multiple storage systems or appliances can be a standalone dual node active-active storage system or appliance that operates and performs processing as discussed above. Furthermore in at least one embodiment, the techniques of the present disclosure can be used to serialize and provide I/O atomicity across the multiple storage systems for one or more suitable applications and configurations. In at least one embodiment, the techniques of the present disclosure can be used in connection with a metro configuration including two storage systems or appliances as mentioned above and further discussed in more detail below. In at least one such embodiment of a metro configuration including two storage systems or appliances, both systems each expose to external storage clients a system-local instance of a storage object, where both instances of the storage object on both systems are configured to have the same identity when exposed to the external storage clients, such as hosts, over paths from the storage systems to such external storage clients. In at least one embodiment of the metro configuration, the two instances of the storage object can be configured for bi-directional or dual synchronous replication of writes received at both systems such that the two instances of the storage object are presented to external clients as having the same or identical content. In at least one embodiment of a metro configuration, for a write I/O that is directed to a target logical address range of the storage object and that is received at a first of the two systems, processing of the write I/O can include implementing the following: 1) first locking entire I/O target address range on both storage systems (e.g., locking the entire I/O target address range on the first system that received the I/O, and then sending a message to the second system requesting that the second system also lock the entire I/O address range); and 2) after successfully locking the entire I/O target logical address range on both systems, perform or service the write I/O itself also on both systems. In at least one embodiment of a metro configuration, the techniques of the present disclosure can be used in connection with providing locking and serialization of I/Os, such as the foregoing write I/O received at the first system, within each of the two individual standalone storage systems when the write I/O is a CSB write I/O crossing a slice border such that the I/O target logical address range includes logical addresses of two slices each owned by a different node within each single storage system (e.g., within each storage system, a first of the two nodes owns a first of the two slices and a second remaining one of the two nodes owns a second remaining one of the two slices).

It should be noted that an embodiment of a metro configuration is but one suitable further application or use of the techniques of the present disclosure. More generally, the techniques of the present disclosure can be used in connection with any suitable application and are not limited to a metro configuration, where such other suitable applications can include, for example, suitable file systems and/or user applications to provide appropriate I/O atomicity and serialization of concurrent I/Os.

In at least one embodiment of a metro configuration as noted above, the techniques of the present disclosure can be used to provide serialization and atomicity of I/Os. In connection with a write I/O in at least one embodiment of a metro configuration, the serialization and locking can include taking locks of the entire write I/O target location across all storage systems of the metro configuration, Once such locks are acquired or taken across all storage systems, the write I/O can then be processed, serviced and committed on both systems. In at least one embodiment of a metro configuration, processing of a write I/O received at a first of the two storage systems can include: 1. The initiator node of the first receiving system sending the write I/O and a request to a corresponding node on the other second storage system to initiate the same operation on the other second storage system. In at least one embodiment, the second can acquire locks for the write I/O such as a CSB write I/O in parallel to the first system also acquiring locks for the write I/O. 2. Normal I/O processing (e.g., such as described in connection with step 1016 of FIG. 9B on the initiator node) can commence only after the first system (that received the write I/O) successfully acquires locks on the entire write I/O target logical address range on the first system and also receives a positive acknowledgement from the second system confirming successfully acquiring locks on the entire write I/O target logical address range on the second system. 3. After acquiring locks on the entire write I/O logical address range on both the first system and second system, the write I/O can be processed, serviced and committed on both systems.

What will now be described is further detail regarding a metro configuration in at least one embodiment in accordance with the techniques of the present disclosure.

Two data storage systems, sites or appliances, such as "site or system A" and "site or system B", can present a single data storage resource or object, such as a volume or logical device, to a client, such as a host. The volume can be configured as a stretched volume or resource where a first volume V1 on site A and a second volume V2 on site B are both configured to have the same identity from the perspective of the external host. The stretched volume can be exposed over paths going to both sites A and B.

In some systems, the stretched volume can be configured for two-way synchronous replication denoting a metro replication configuration or metro configuration where the host can issue I/Os, including writes, to the stretched volume over paths to both site A and site B, where writes to the stretched volume on each of the sites A and B are automatically synchronously replicated to the other peer site. In this manner with the metro configuration, the two data storage systems or sites can be configured for two-way or bi-directional synchronous replication for the configured stretched volume or other storage resource or object.

In at least one embodiment, a stretched volume can generally denote a single stretched storage resource or object configured from two local storage resources, objects or copies, respectively, on the two different sites or storage systems A and B, where the local two storage resources are configured to have the same identity as presented to a host or other external client. Sometimes, a stretched volume can also be referred to herein as a metro volume. More generally, sometimes a stretched storage resource or object can be referred to herein as a metro storage object or resource.

In at least one embodiment, a stretched resource or object can be any one of a set of defined resource types including one or more of: a volume, a logical device; a file; a file system; a sub-volume portion; a virtual volume used by a virtual machine; a portion of a virtual volume used by a virtual machine; a portion of a file system; a directory of files; and/or a portion of a directory of files. Thus although the techniques of the present disclosure can be described herein with reference to stretched volumes or logical devices, the techniques of the present disclosure can more generally be applied for use in connection with any suitable stretched resource or object.

In at least one embodiment, a storage object group or resource group construct can also be utilized where the group can denote a logically defined grouping of one or more storage objects or resources. In particular, a stretched or metro volume group can denote a logically defined grouping of one or more stretched volumes. More generally, a stretched or metro storage resource group or object group can denote a logically defined grouping of one or more stretched objects or resources.

Figure 11:
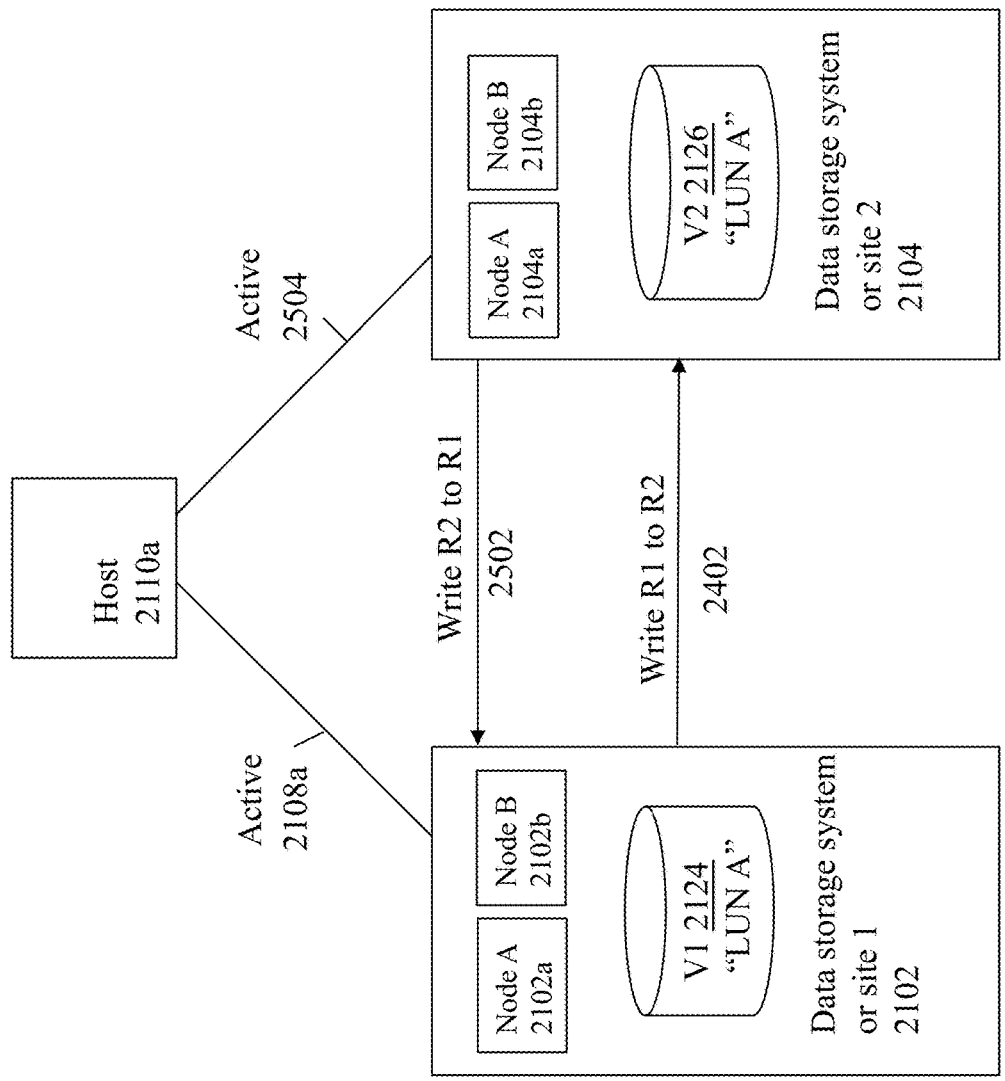

Referring to FIG. 11, shown is an example configuration of components that can be used in an at least one embodiment in accordance with the techniques of the present disclosure. The example 2500 illustrates an active-active configuration that can be used in connection with synchronous replication in at least one embodiment.

In the following discussion for purposes of illustration, the metro or stretched volume can be configured from two instances (2124, 2126) on two storage systems or sites (2102, 2104) where the two instances (2124, 2126) are configured to have the same identify of LUN A, denoting a volume or logical device LUN A.

The example 2500 includes the host 2110*a*, and storage systems or sites 2102, 2104. Each of the systems or sites 2102, 2104 can be a dual node storage system as discussed elsewhere herein. In at least one embodiment, each of the systems 2102, 2104 can perform processing as discussed above in connection with the techniques of the present disclosure.

In the active-active configuration or state with synchronous replication, the host 2110*a* can have a first active path 2108*a* to the first data storage system 1 2102 including a V1 device 2124 configured as LUN A. Additionally, the host 2110*a* can have a second active path 2504 to the second data storage system 2 2104 including a V2 device 2126 configured as the same LUN A. From the view of the host 2110*a*, the paths 2108*a* and 2504 appear as 2 paths to the same LUN A where the host in the example 2500 configuration can issue I/Os, both reads and/or writes, over both of the active paths 2108*a* and 2504. Thus from the viewpoint of the host 2110*a*, both instances 2124, 2126 of LUN A appear as the same volume or logical device, LUN A.

The host 2110*a* can send a first write over the path 2108*a* which is received by the first system 2102 and written to the log or cache of, or more generally committed by, the system 2102 where, at a later point in time, the first write is destaged from the cache or log of the system 2102 to physical storage provisioned for the V1 device 2124 configured as the LUN A. The system 2102 also sends the first write to the system 2104 over the link 2402 where the first write is written to the log or cache of (or more generally committed by) the system 2104, where, at a later point in time, the first write is destaged from the cache or log of the system 2104 to physical storage provisioned for the V2 device 2126 configured as the LUN A. Once the first write is written to the cache or log of (e.g., committed by) the system 2104, the system 2104 sends an acknowledgement over the link 2402 to the system 2102 that it has completed the first write. The system 2102 receives the acknowledgement from the system 2104 and then returns an acknowledgement to the host 2110*a* over the path 2108*a*, where the acknowledgement indicates to the host that the first write has completed.

The first write request can be directly received by the system or site 2102 from the host 2110*a* as noted above. Alternatively in a configuration of FIG. 11 in at least one embodiment, a write request, such as the second write request discussed below, can be initially received by the system or site 2104 and then forwarded to the site 2102 for servicing. In particular, the host 2110*a* can send the second write over the path 2504 which is received by the system 2104 and written to the cache or log of (more generally committed by) the system 2104 where, at a later point in time, the second write is destaged from the cache or log of the system 2104 to physical storage provisioned for the V2 device 2126 configured as the LUN A. The system 2104 also sends the second write to the system 2102 over the link 2502 where the second write is written to the cache or log of (more generally committed by) the system 2102, where, at a later point in time, the second write is destaged from the cache or log of the system 2102 to physical storage provisioned for the V1 device 2124 configured as the LUN A. Once the second write is written to the cache or log of the system 2102, the system 2102 sends an acknowledgement over the link 2502 to the system 2104 that it has completed the second write. The system 2104 receives the acknowledgement from the system 2102 and then returns an acknowledgement to the host 2110*a* over the path 2502, where the acknowledgement indicates to the host that the second write has completed.

In the example 2500, the illustrated active-active configuration includes the stretched LUN A configured from the device or volume pair (V1 2124, V2 2126), where the device or object pair (V1 2124, V2, 2126) is further configured for synchronous replication from the system 2102 to the system 2104, and also configured for synchronous replication from the system 2104 to the system 2102. In particular, the stretched LUN A is configured for dual, bi-directional or two way synchronous remote replication:

synchronous remote replication of writes from V1 2124 to V2 2126, and synchronous remote replication of writes from V2 2126 to V1 2124. To further illustrate synchronous remote replication from the system 2102 to the system 2104 for the stretched LUN A, a write to the stretched LUN A sent over 2108*a* to the system 2102 is stored on the V1 device 2124 and also transmitted to the system 2104 over 2402. The write sent over 2402 to system 2104 is stored on the V2 device 2126. Such replication is performed synchronously in that the received host write sent over 2108*a* to the data storage system 2102 is not acknowledged as successfully completed to the host 2110*a* unless and until the write data has been stored in caches or logs of, or otherwise committed or stored persistently by, both the systems 2102 and 2104.

In a similar manner, the illustrated active-active configuration of the example 2500 provides for synchronous replication from the system 2104 to the system 2102, where writes to the LUN A sent over the path 2504 to system 2104 are stored on the device 2126 and also transmitted to the system 2102 over the connection 2502. The write sent over 2502 is stored on the V1 device 2124. Such replication is performed synchronously in that the acknowledgement to the host write sent over 2504 is not acknowledged as successfully completed unless and until the write data has been stored in caches or logs of, or otherwise committed or stored persistently by, both the systems 2102 and 2104.

It should be noted that FIG. 11 illustrates a configuration with only a single host connected to both systems 2102, 2104 of the metro cluster. More generally, a configuration such as illustrated in FIG. 11 can include multiple hosts where one or more of the hosts are connected to both systems 2102, 2104 and/or one or more of the hosts are connected to only a single of the systems 2102, 2104.

Although only a single link 2402 is illustrated in connection with replicating data from systems 2102 to system 2104, more generally any number of links can be used. Although only a single link 2502 is illustrated in connection with replicating data from systems 2104 to system 2102, more generally any number of links can be used. Furthermore, although 2 links 2402 and 2502 are illustrated, in at least one embodiment, a single link can be used in connection with sending data from system 2102 to 2104, and also from 2104 to 2102.

FIG. 11 illustrates an active-active remote replication configuration for the stretched LUN A. The stretched LUN A is exposed to the host 2110*a* by having each volume or device of the device pair (V1 device 2124, V2 device 2126) configured and presented to the host 2110*a* as the same volume or LUN A. Additionally, the stretched LUN A is configured for two way synchronous remote replication between the systems 2102 and 2104 respectively including the two devices or volumes of the device pair, (V1 device 2124, V2 device 2126).

In FIG. 11, the first storage system 1 2102 can include node A 2102*a* and node B 2102*b*; and the second storage system 2 2104 can include node A 2104*a* and node B 2104*b*. Each of the systems 2102, 2104 can perform processing as described herein. For example, each of the nodes 2102*a-b*, 2104*a-c* can perform processing as described in connection with FIGS. 9A-9B and 10A-10B. Additionally, the systems 2102, 2104, and nodes thereof, can also perform processing as described herein, and in more detail below, in connection with a metro configuration.

Figure 12B:
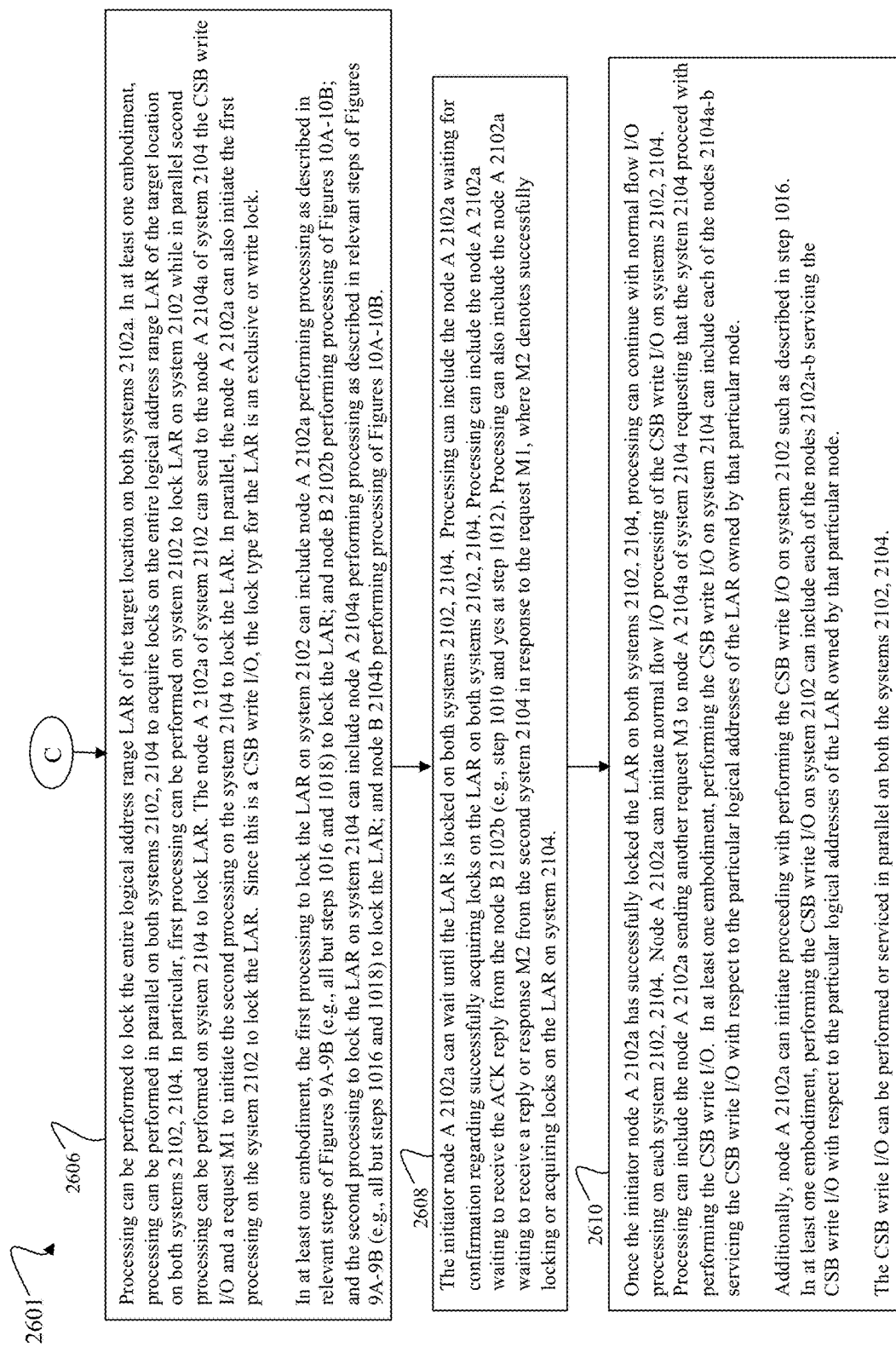
Figure 12C:
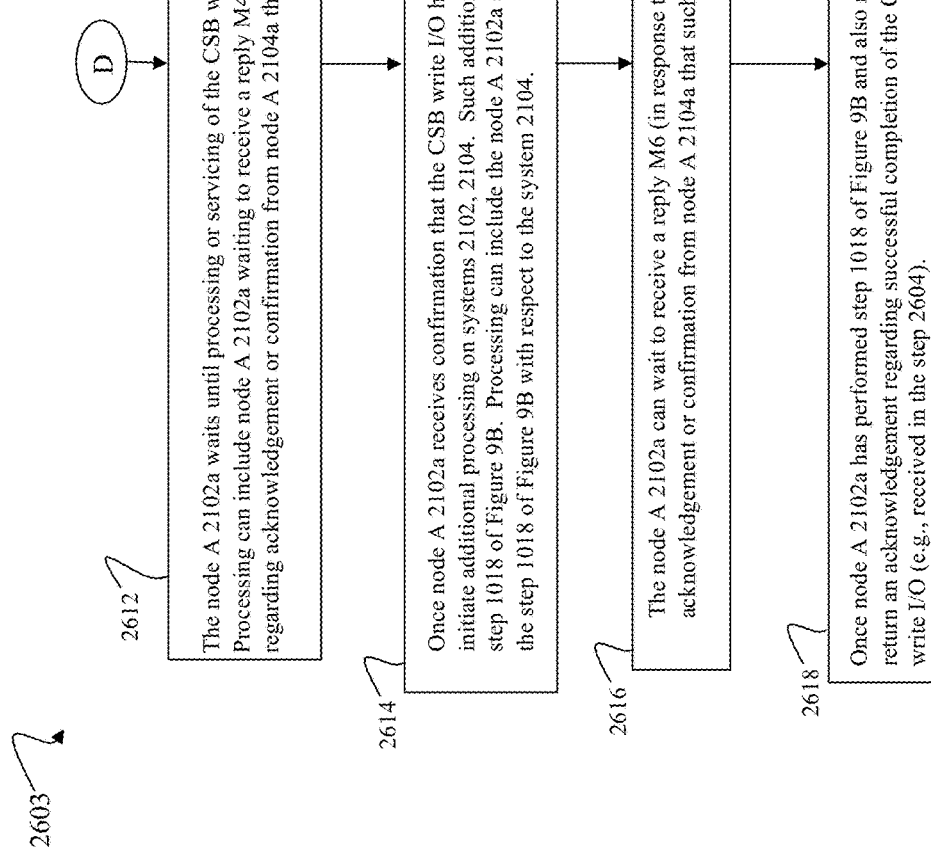

Referring to FIGS. 12A-12C, shown is a flowchart 2600, 2601, 2603 of processing steps that can be performed in at least one embodiment in accordance with the techniques of the present disclosure in connection with a metro configuration.

At the step 2602, the UD logical address space of volume or LUN A can be partitioned into slices, where exclusive ownership of each slice is then assigned to a single one of the nodes A or B on each of the systems 2102, 2104. In at least one embodiment, slices can be assigned in an alternating manner such as discussed in connection with FIG. 6 such that node A owns all slices having an odd slice ID and node B owns all slices having an even slice ID. Thus node A 2102*a* and node A 2104*a* can both own the same first set of odd slices of LUN A; and node B 2102*b* and node B 2104*b* can both own the same set of even slices of LUN A. System local volume instances V1 2124 and V2 2126 can be configured in a metro configuration such that the volume or instance pair (V1 2124, V2 2126) is configured for bi-directional or two-way synchronous replication, where V1 2124 and V2 2126 are each configured to have the same identity of LUN A when exposed to the host 2110a over paths 2108a, 2504. The host 2110a can send I/Os, and in particular CSB write I/Os, to any of the nodes 2102a-b, 2104a-b, respectively, of the systems 2102, 2104. From the step 2602, control proceeds to the step 2604.

At the step 2604, an initiator node A 2102a of storage system 2102 receives a CSB write I/O directed to a target location of LUN A, where the target location of the CSB write I/O crosses a slice border B11 between two slices Y1 and Y2 of LUN A. The target location includes logical addresses spanning the two slices Y1 and Y2 each owned by a different node in the dual node storage systems 2102, 2104. Each of the two slices Y1, Y2 can denote a consecutive contiguous logical address range, and collectively, the two slices Y1, Y2 can form a single contiguous logical address range CR of the same storage object such as a same logical device or volume LUN A. Y1 can be owned by the node As 2102a, 2104a. Y2 can be owned by the node Bs 2102b, 2104b. The target location can include a first set S1 of logical addresses of slice Y1 owned by the node As 2102a, 2104a, and can include a second set S2 of logical addresses of slice Y2 owned by node Bs 2102b, 2104b.

Slice Y1 can have a first consecutive logical address range R1 having a lower bound (LB) logical address of R1a and an upper bound (UB) logical address of R1b. Slice Y2 can have a second consecutive logical address range R2 with a LB address of R2a and an UB logical address of R2b. R1 can denote a lower address range than R2 such that each logical address of R1 is less than each logical address of R2. The single contiguous logical address range CR can have an associated LB=R1a and an associated UB=R2b. The slice border or CSB B11 between the slices Y1 and Y2 can be denoted by R1b, the largest or last logical address of the slice Y1 having the lower address range relative to the two slices Y1 and Y2. From the step 2604, control proceeds to the step 2606.

At the step 2606, processing can be performed to lock the entire logical address range LAR of the target location on both systems 2102a. In at least one embodiment, processing can be performed in parallel on both systems 2102, 2104 to acquire locks on the entire logical address range LAR of the target location on both systems 2102, 2104. In particular, first processing can be performed on system 2102 to lock LAR on system 2102 while in parallel second processing can be performed on system 2104 to lock LAR. The node A 2102a of system 2102 can send to the node A 2104a of system 2104 the CSB write I/O and a request M1 to initiate the second processing on the system 2104 to lock the LAR. In parallel, the node A 2102a can also initiate the first processing on the system 2102 to lock the LAR.

In at least one embodiment, the first processing to lock the LAR on system 2102 can include node A 2102a performing processing as described in relevant steps of FIGS. 9A-9B (e.g., all but steps 1016 and 1018) to lock the LAR; and node B 2102b performing processing of FIGS. 10A-10B; and the second processing to lock the LAR on system 2104 can include node A 2104a performing processing as described in relevant steps of FIGS. 9A-9B (e.g., all but steps 1016 and 1018) to lock the LAR; and node B 2104b performing processing of FIGS. 10A-10B. Since this is a CSB write I/O, the lock type for the LAR is an exclusive or write lock. From the step 2606, control proceeds to the step 2608.

At the step 2608, the initiator node A 2102a can wait until the LAR is locked on both systems 2102, 2104. Processing can include the node A 2102a waiting for confirmation regarding successfully acquiring locks on the LAR on both systems 2102, 2104. Processing can include the node A 2102a waiting to receive the ACK reply from the node B 2102b (e.g., step 1010 and yes at step 1012). Processing can also include the node A 2102a waiting to receive a reply or response M2 from the second system 2104 in response to the request M1, where M2 denotes successfully locking or acquiring locks on the LAR on system 2104. From the step 2608, control proceeds to the step 2610.

At the step 2610, once the initiator node A 2102a has successfully locked the LAR on both systems 2102, 2104, processing can continue with normal flow I/O processing on each system 2102, 2104. Node A 2102a can initiate normal flow I/O processing of the CSB write I/O on systems 2102, 2104. Processing can include the node A 2102a sending another request M3 to node A 2104a of system 2104 requesting that the system 2104 proceed with performing the CSB write I/O. In at least one embodiment, performing the CSB write I/O on system 2104 can include each of the nodes 2104a-b servicing the CSB write I/O with respect to the particular logical addresses of the LAR owned by each particular node. Additionally, node A 2102a can initiate proceeding with performing the CSB write I/O on system 2102 such as described in step 1016. In at least one embodiment, performing the CSB write I/O on system 2102 can include each of the nodes 2102a-b servicing the CSB write I/O with respect to the particular logical addresses of the LAR owned by each particular node. The CSB write I/O can be performed or serviced in parallel on both the systems 2102, 2104. From the step 2610, control proceeds to the step 2612.

At the step 2612, the node A 2102a waits until processing or servicing of the CSB write I/O is complete by both systems 2102, 2104. Processing can include node A 2102a waiting to receive a reply M4 (in response to M3 sent from node A 2102a to node A 2104a) regarding acknowledgement or confirmation from node A 2104a that the CSB write I/O has been performed or serviced on system 2104. From the step 2612, control proceeds to the step 2614.

At the step 2614, once node A 2102a receives confirmation that the CSB write I/O has been serviced by systems 2102, 2104, node A 2102a can initiate additional processing on systems 2102, 2104. Such additional processing on system 2102 can include node A 2102a performing step 1018 of FIG. 9B. Processing can include the node A 2102a sending a request M5 to the node A 2104a to similarly perform the step 1018 of FIG. 9B with respect to the system 2104. From the step 2614, control proceeds to the step 2616.

At the step 2616, the node A 2102a can wait to receive a reply M6 (in response to M5 send from node A 2102a to node A 2104a) regarding acknowledgement or confirmation from node A 2104a that such additional processing has been completed on system 2104. From the step 2616, control proceeds to the step 2618.

At the step 2618, once node A 2102a has performed step 1018 of FIG. 9B and also received the reply M6 from node A 2104a, node A 2102a can return an acknowledgement regarding successful completion of the CSB write I/O to the host or other storage client that sent the CSB write I/O (e.g., received in the step 2604).

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   receiving, at a first node of a system, a cross slice border (CSB) I/O directed to a target location that includes logical addresses of two slices of a logical address range of a storage object, wherein a first of the two slices is owned by the first node and a second of the two slices is owned by a second node of the system, and wherein a first CSB denotes a slice border between the first slice and the second slice;
   adding a first entry to a first cross border hash table (CBHT) of the first node, wherein the first entry indicates that the CSB I/O includes a corresponding target location that crosses the first CSB;
   the first node acquiring first one or more locks for first logical addresses of the first slice owned by the first node, where the first logical addresses are included in the target location of the CSB I/O;
   the first node sending a remote procedure call (RPC) to the second node, wherein the RPC includes a request to acquire second one or more locks, on behalf of the first node, for second logical addresses of the second slice owned by the second node, wherein the second logical addresses are included in the target location of the CSB I/O;
   receiving, at the first node from the second node, an RPC reply in response to the RPC;
   determining whether the RPC reply indicates a positive acknowledgement or a negative acknowledgement regarding the request to acquire the second one or more locks for the second logical addresses owned by the second node; and
   responsive to receiving the RPC reply that indicates the negative acknowledgement, performing first processing including:
      the first node releasing the first one or more locks for the first one or more logical addresses owned by the first node; and
      the first node removing the first entry from the first CBHT of the first node.

2. The computer-implemented method of claim 1, wherein the first processing includes:
   the first node restarting I/O processing for the CSB I/O.

3. The computer-implemented method of claim 2, wherein said restarting I/O processing for the CSB I/O includes:
   adding a second entry to the first CBHT of the first node, wherein the second entry indicates that the CSB I/O includes a corresponding target location that crosses the first CSB;
   the first node acquiring the first one or more locks for the first logical addresses of the first slice owned by the first node;
   the first node sending a second RPC to the second node, wherein the second RPC includes a second request to acquire the second one or more locks, on behalf of the first node, for the second logical addresses of the second slice owned by the second node;
   receiving, at the first node from the second node, a second RPC reply in response to the second RPC;
   determining whether the second RPC reply indicates a second positive acknowledgement or a second negative acknowledgement regarding the second request to acquire the second one or more locks for the second logical addresses owned by the second node; and
   responsive to receiving the second RPC reply that indicates the second negative acknowledgement, performing second processing including:
      the first node releasing the first one or more locks for the first one or more logical addresses owned by the first node; and
      the first node removing the second entry from the first CBHT of the first node.

4. The computer-implemented method of claim 3, wherein said restarting I/O processing for the CSB I/O includes:
   responsive to receiving the second RPC reply that indicates the second positive acknowledgement, performing third processing including:
      performing I/O processing to service the CSB I/O;
      sending, from the first node, a third RPC to the second node, wherein the third RPC requests that the second node release the second one or more locks for the second one or more logical addresses owned by the second node; and
      the first node removing the second entry from the first CBHT of the first node.

5. The computer-implemented method of claim 1, further comprising:
   responsive to receiving the RPC reply that indicates the positive acknowledgement, performing second processing including:
      performing I/O processing to service the CSB I/O;
      sending, from the first node, a second RPC to the second node, wherein the second RPC requests that the second node release the second one or more locks for the second one or more logical addresses owned by the second node; and
      the first node removing the first entry from the first CBHT of the first node.

6. The computer-implemented method of claim 1, further comprising:
   the second node receiving the RPC from the first node; and
   the second node atomically performing second processing that includes: querying a second CBHT of the second node, and attempting to add a second entry to the second CBHT of the second node, wherein the second entry indicates that the CSB I/O includes a corresponding target location that crosses the first CSB, wherein said second entry is added if said querying determines that there is no existing entry in the second CBHT for the first CSB.

7. The computer-implemented method of claim 6, further comprising
   determining whether the second entry is successfully added to the second CBHT as a result of atomically performing said second processing; and
   responsive to determining that the second entry is successfully added to the second CBHT as a result of atomically performing said second processing, performing third processing including:
      acquiring, on behalf of the first node and in accordance with the request of the RPC, the second one or more locks for the second one or more logical addresses owned by the second node; and
      sending the RPC reply from the second node to the first node where the RPC reply indicates the positive acknowledgement.

8. The computer-implemented method of claim 7, wherein successfully adding the second entry to the second CBHT as a result of atomically performing said second processing indicates that there is no other outstanding concurrent CSB I/O directed to a second target location that crosses the first CSB by including corresponding logical addresses from both the first slice and the second slice.

9. The computer-implemented method of claim 7, further comprising:
   responsive to determining that the second entry is not successfully added to the second CBHT as a result of atomically performing said second processing, performing fourth processing including:
      determining whether the first node is a winner; and
      responsive to determining the first node is the winner, performing fifth processing including:
         acquiring, on behalf of the first node and in accordance with the request of the RPC, the second one or more locks for the second one or more logical addresses owned by the second node; and
         sending the RPC reply from the second node to the first node where the RPC reply indicates the positive acknowledgement.

10. The computer-implemented method of claim 9, wherein the fourth processing comprises:
   responsive to determining the first node is not the winner whereby the second node is alternatively the winner, performing sixth processing including:
      rejecting the request of the RPC to acquire the second one or more locks for the second one or more logical addresses owned by the second node; and
      sending the RPC reply from the second node to the first node where the RPC reply indicates the negative acknowledgement.

11. The computer-implemented method of claim 9, wherein failing to add the second entry to the second CBHT as a result of atomically performing said second processing indicates that there is already a second outstanding concurrent CSB I/O directed to a second target location that crosses the first CSB by including corresponding logical addresses from both the first slice and the second slice.

12. The computer-implemented method of claim 9, wherein said determining whether the first node is the winner includes:
   determining which of the first node and the second node owns a particular one of the first slice and the second slice that is left of the first CSB, wherein the particular one slice left of the first CSB corresponds to a single one of the first slice and the second slice having a corresponding address range less than the first CSB.

13. The computer-implemented method of claim 1, wherein the CSB I/O is a CSB read I/O requesting to read current contents from the target location, and wherein the first one or more locks and the second one or more locks are read or shared locks providing read or shared access, respectively, to the first one or more logical addresses owned by the first node and the second one or more logical addresses owned by the second node.

14. The computer-implemented method of claim 1, wherein the CSB I/O is a CSB write I/O requesting to write new content to the target location, and wherein the first one or more locks and the second one or more locks are write or exclusive locks providing exclusive access, respectively, to the first one or more logical addresses owned by the first node and the second one or more logical addresses owned by the second node.

15. The computer-implemented method of claim 1, further comprising:
   in response to receiving the RPC, the second node performs second processing including:
      detecting, using a second CBHT of the second node, a deadlock or a potential deadlock with respect to the first CSB in that there is a second concurrent outstanding CSB I/O that was received by the second node and that is directed to a second target location crossing a same CSB, the first CSB, as the CSB I/O where the second target location includes corresponding logical addresses from both the first slice and the second slice;
      the second node determining that the second node is a winner and the first node is a loser in connection with the deadlock or potential deadlock between the second concurrent outstanding CSB I/O received by the second node and the CSB I/O received by the first node; and
      responsive to determining the second node is the winner and the first node is the loser in connection with the deadlock or potential deadlock, performing third processing including:
         rejecting the request by the first node to acquire the second one or more locks; and
         the second node returning the RPC reply indicating the negative acknowledgement.

16. The computer-implemented method of claim 1, further comprising:
   in response to receiving the RPC, the second node performs second processing including:
      detecting, using a second CBHT of the second node, a deadlock or a potential deadlock with respect to the first CSB in that there is a second concurrent outstanding CSB I/O that was received by the second node and that is directed to a second target location crossing a same CSB, the first CSB, as the CSB I/O where the second target location includes corresponding logical addresses from both the first slice and the second slice;
      the second node determining that the first node is a winner and the second node is a loser in connection with the deadlock or potential deadlock between the second concurrent outstanding CSB I/O received by the second node and the CSB I/O received by the first node; and
      responsive to determining the first node is the winner and the second node is the loser in connection with the deadlock or potential deadlock, performing third processing including:

the second node acquiring the second one or more locks on behalf of the first node; and the second node returning the RPC reply indicating the positive acknowledgement.

17. The computer-implemented method of claim 1, further comprising:

in response to receiving the RPC, the second node performs second processing including:

determining, using a second CBHT of the second node, that there is no deadlock or potential deadlock with respect to the first CSB in that there is no second concurrent outstanding CSB I/O directed to a second target location crossing a same CSB, the first CSB, as the CSB I/O where the second target location includes corresponding logical addresses from both the first slice and the second slice;

the second node granting the request of the RPC sent by the first node, wherein said granting includes acquiring the second one or more locks on behalf of the first node; and the second node returning the RPC reply indicating the positive acknowledgement.

18. The computer-implemented method of claim 1, wherein the system is a first storage system included in a metro configuration with a second storage system, wherein the CSB I/O is a write I/O directed to a first storage object, wherein the first storage system includes a first instance of the first storage object and the second storage system includes a second instance of the first storage object, wherein the first instance and the second instance are configured for bi-directional or two-way synchronous replication such that writes directed to the first storage object received at the first storage system are automatically synchronously replicated to the second storage system and writes directed to the first storage object received at the second storage system are automatically synchronously replicated to the first storage system.

19. A system comprising:

one or more processors; and a memory comprising code stored thereon that, when executed, performs a method comprising:

receiving, at a first node of a system, a cross slice border (CSB) I/O directed to a target location that includes logical addresses of two slices of a logical address range of a storage object, wherein a first of the two slices is owned by the first node and a second of the two slices is owned by a second node of the system, and wherein a first CSB denotes a slice border between the first slice and the second slice;

adding a first entry to a first cross border hash table (CBHT) of the first node, wherein the first entry indicates that the CSB I/O includes a corresponding target location that crosses the first CSB;

the first node acquiring first one or more locks for first logical addresses of the first slice owned by the first node, where the first logical addresses are included in the target location of the CSB I/O;

the first node sending a remote procedure call (RPC) to the second node, wherein the RPC includes a request to acquire second one or more locks, on behalf of the first node, for second logical addresses of the second slice owned by the second node, wherein the second logical addresses are included in the target location of the CSB I/O;

receiving, at the first node from the second node, an RPC reply in response to the RPC;

determining whether the RPC reply indicates a positive acknowledgement or a negative acknowledgement regarding the request to acquire the second one or more locks for the second logical addresses owned by the second node; and responsive to receiving the RPC reply that indicates the negative acknowledgement, performing first processing including:

the first node releasing the first one or more locks for the first one or more logical addresses owned by the first node; and the first node removing the first entry from the first CBHT of the first node.

20. A non-transitory computer readable medium comprising code stored thereon that, when executed, performs a method comprising:

receiving, at a first node of a system, a cross slice border (CSB) I/O directed to a target location that includes logical addresses of two slices of a logical address range of a storage object, wherein a first of the two slices is owned by the first node and a second of the two slices is owned by a second node of the system, and wherein a first CSB denotes a slice border between the first slice and the second slice;

adding a first entry to a first cross border hash table (CBHT) of the first node, wherein the first entry indicates that the CSB I/O includes a corresponding target location that crosses the first CSB;

the first node acquiring first one or more locks for first logical addresses of the first slice owned by the first node, where the first logical addresses are included in the target location of the CSB I/O;

the first node sending a remote procedure call (RPC) to the second node, wherein the RPC includes a request to acquire second one or more locks, on behalf of the first node, for second logical addresses of the second slice owned by the second node, wherein the second logical addresses are included in the target location of the CSB I/O;

receiving, at the first node from the second node, an RPC reply in response to the RPC;

determining whether the RPC reply indicates a positive acknowledgement or a negative acknowledgement regarding the request to acquire the second one or more locks for the second logical addresses owned by the second node; and responsive to receiving the RPC reply that indicates the negative acknowledgement, performing first processing including:

the first node releasing the first one or more locks for the first one or more logical addresses owned by the first node; and the first node removing the first entry from the first CBHT of the first node.

* * * * *